United States Patent
Kim et al.

(10) Patent No.: US 8,638,873 B2
(45) Date of Patent: Jan. 28, 2014

(54) MULTIPLE-INPUT MULTIPLE-OUTPUT (MIMO) COMMUNICATION SYSTEM USING REGULARIZED BEAMFORMING

(75) Inventors: Ki Il Kim, Yongin-si (KR); Bruno Clerckx, Seoul (KR); Jun Il Choi, Seoul (KR); Inkyu Lee, Seoul (KR); Seok Hwan Park, Hanam-si (KR); Hae Wook Park, Seoul (KR); Han Bae Kong, Seoul (KR)

(73) Assignees: Samsung Electronics Co., Ltd., Suwon-si (KR); Korea University Industrial & Academic Collaboration Foundation, Seoul (KR)

( * ) Notice: Subject to any disclaimer, the term of this patent is extended or adjusted under 35 U.S.C. 154(b) by 137 days.

(21) Appl. No.: 13/411,721

(22) Filed: Mar. 5, 2012

(65) Prior Publication Data
US 2012/0224648 A1    Sep. 6, 2012

(30) Foreign Application Priority Data
Mar. 4, 2011    (KR) .......................... 10-2011-0019366

(51) Int. Cl.
*H04L 1/02*    (2006.01)
*H04L 27/06*    (2006.01)

(52) U.S. Cl.
USPC .......................................... 375/267; 375/349

(58) Field of Classification Search
USPC ......... 375/267, 130, 146, 152, 260, 308, 324, 375/340, 349; 370/207, 345, 527; 455/422.1, 500, 517, 562.1
See application file for complete search history.

(56) References Cited

U.S. PATENT DOCUMENTS

| | | | |
|---|---|---|---|
| 7,751,463 B2 * | 7/2010 | Bottomley et al. | 375/142 |
| 2005/0047384 A1 * | 3/2005 | Wax et al. | 370/338 |
| 2010/0027471 A1 | 2/2010 | Palanki et al. | |
| 2010/0056215 A1 | 3/2010 | Gorokhov et al. | |
| 2010/0144334 A1 | 6/2010 | Gorokhov et al. | |

FOREIGN PATENT DOCUMENTS

| | | |
|---|---|---|
| KR | 10-2009-0072135 A | 7/2009 |
| KR | 10-2009-0088273 A | 8/2009 |
| KR | 10-2010-0100578 A | 9/2010 |

* cited by examiner

*Primary Examiner* — Khai Tran
(74) *Attorney, Agent, or Firm* — NSIP Law

(57) ABSTRACT

Provided are a beamforming vector determining method and an apparatus which may compute a normalization factor of each of a plurality of terminals by normalizing a predetermined reference value using noise power occurring in each of the terminals. A leakage channel of each of the terminals may be estimated, and a beamforming vector for each of the terminals may be determined with respect to a plurality of base stations based on the leakage channel of each of the terminals.

14 Claims, 3 Drawing Sheets

MULTIPLE-INPUT MULTIPLE-OUTPUT (MIMO) COMMUNICATION SYSTEM USING REGULARIZED BEAMFORMING

CROSS-REFERENCE TO RELATED APPLICATION(S)

This application claims the benefit under 35 U.S.C. §119(a) of Korean Patent Application No. 10-2011-0019366, filed on Mar. 4, 2011, in the Korean Intellectual Property Office, the entire disclosure of which is incorporated herein by reference for all purposes.

BACKGROUND

1. Field

The following description relates to a multiple-input multiple-output (MIMO) communication system.

2. Description of Related Art

A multiple-input multiple-output (MIMO) communication system may include a plurality of base stations and a plurality of terminals. During a downlink, a plurality of base stations may exist, and thus, the plurality of terminals may receive data transmitted from the plurality of base stations, thereby increasing a transmission amount. However, as a result of the plurality of base stations, interference may increase in the plurality of terminals and noise may occur in each of the respective plurality of terminals. Each of the plurality of base stations may have a power constraint.

In this example, to design a beamforming vector for each terminal may significantly affect the total system throughput.

SUMMARY

In one general aspect, there is provided a method of determining a beamforming vector in a multiple-input multiple-output (MIMO) communication system comprising a plurality of base stations and a plurality of terminals, the method including computing a normalization factor for each of the terminals by normalizing a predetermined reference value using a respective noise power occurring in each of the terminals, computing a leakage channel of each of the terminals via which interference occurs due to a beamforming vector for each of the terminals, based on the computed normalization factors of each of the terminals, and determining the beamforming vector for each of the terminals with respect to the plurality of base stations based on the leakage channel of each of the terminals.

The determining may comprise determining the beamforming vector for each of the terminals to increase a signal to leakage and noise ratio (SLNR) of each of the terminals.

The method may further comprise computing first beamforming vectors for each of the terminals in which noise power occurring in each of the other terminals is discarded, wherein the determining comprises determining the beamforming vector for each of the terminals using the leakage channel and the first beamforming vectors.

The computing of the beamforming vector may comprise computing the beamforming vector for each of the terminals using a sum of the first powers of the first beamforming vectors.

A first terminal from among the plurality of terminals may be connected to a first set comprising a portion of the plurality of base stations, and a second terminal from among the plurality of terminals may be connected to a second set comprising another portion of the plurality of base stations.

The method may further comprise setting a set of terminals connected to each base station, and setting a set of base stations connected to each terminal, wherein the computing of the leakage channel comprises computing the leakage channel of a terminal based on the set of base stations connected to the terminal, and the determining comprises determining the beamforming vector for the terminal based on the set of terminals connected to the corresponding base station.

The determining may comprise computing an SLNR of each of the terminals based on the leakage channel of each of the terminals.

In another aspect, there is provided a computer-readable storage medium having stored therein program instructions to cause a processor to execute a method of determining a beamforming vector in a multiple-input multiple-output (MIMO) communication system comprising a plurality of base stations and a plurality of terminals, the method including computing a normalization factor for each of the terminals by normalizing a predetermined reference value using a respective noise power occurring in each of the terminals, computing a leakage channel of each of the terminals via which interference occurs due to a beamforming vector for each of the terminals, based on the computed normalization factor of each of the terminals, and determining the beamforming vector for each of the terminals with respect to the plurality of base stations based on the leakage channel of each of the terminals.

In another aspect, there is provided a communication apparatus for determining a beamforming vector in a multiple-input multiple-output (MIMO) communication system comprising a plurality of base stations and a plurality of terminals, the apparatus including a computing unit configured to compute a normalization factor for each of the terminals by normalizing a predetermined reference value using a respective noise power occurring in each of the terminals, an estimator configured to estimate a leakage channel of each of the terminals via which interference occurs due to a beamforming vector for each of the terminals, based on the computed normalization factors of each of the terminals, and a determining unit configured to determine the beamforming vector for each of the terminals with respect to the plurality of base stations based on the leakage channel of each of the terminals.

The determining unit may be configured to determine the beamforming vector for each of the terminals to increase a signal to leakage and noise ratio (SLNR) of each of the terminals.

The computing unit may be further configured to compute first beamforming vectors for each of the terminals in which noise power occurring in each of the other terminals is discarded, and the determining unit may be further configured to determine the beamforming vector for each of the terminals using the leakage channel and the first beamforming vectors.

The computing of the beamforming vector may comprise computing the beamforming vector for each of the terminals using a sum of the first powers of the first beamforming vectors.

A first terminal from among the plurality of terminals may be connected to a first set comprising a portion of the plurality of base stations, and a second terminal from among the plurality of terminals may be connected to a second set comprising another portion of the plurality of base stations.

The determining unit may be further configured to compute an SLNR of each of the terminals based on the leakage channel of each of the terminals.

Other features and aspects will be apparent from the following detailed description, the drawings, and the claims.

Figure 1:
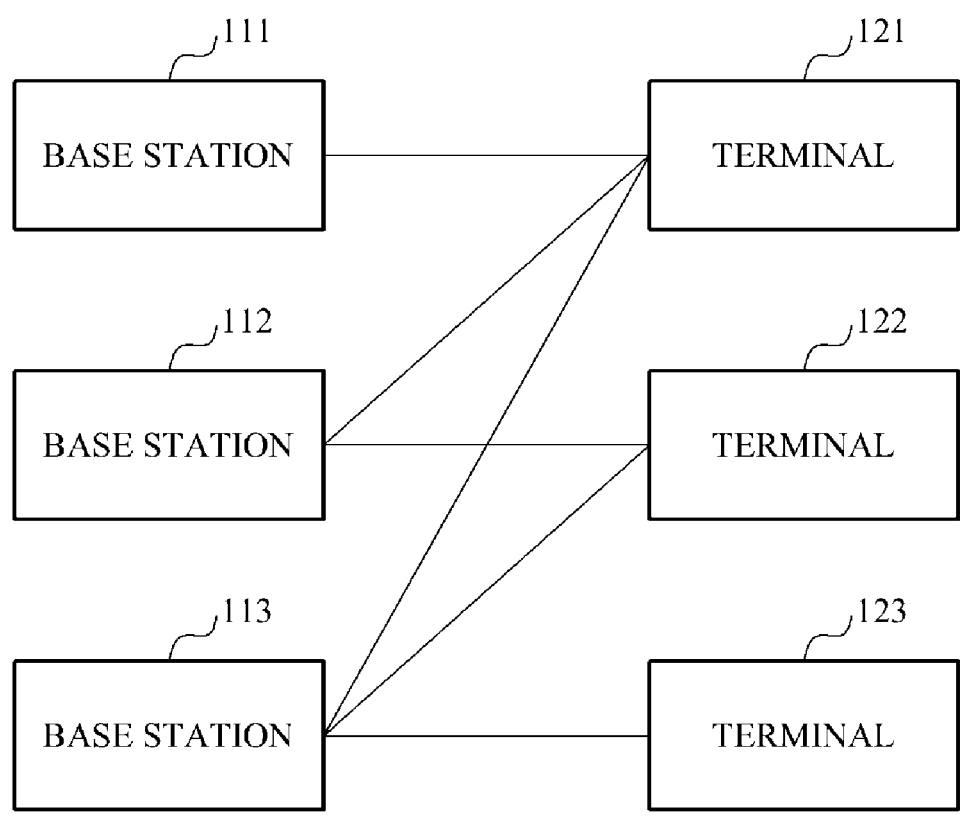
FIG. 1 is a diagram illustrating an example of a multiple-input multiple-output (MIMO) communication system.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, description of well-known functions and constructions may be omitted for increased clarity and conciseness.

FIG. 1 illustrates an example of a multiple-input multiple-output (MIMO) communication system.

Referring to FIG. 1, the MIMO communication system includes a plurality of base stations 111, 112, and 113, and a plurality of terminals 121, 122, and 123.

Each of the base stations 111, 112, and 113 may include a plurality of transmit antennas, for example, two, four, eight, and the like. Further, each of the terminals 121, 122, and 123 may include at least one receive antenna or more. The throughput of a communication system may increase without increasing frequency resources because of the plurality of transmit antennas and the at least one receive antenna. For example, the throughput may be further enhanced through cooperation among the plurality of base stations 111, 112, and 113. Such cooperation technology may also refer to a coordinated multiple point transmission/reception (CoMP) technology which may be applied to the network MIMO communication system.

The CoMP technology may be generally classified into two algorithms, for example, a coordinated scheduling/coordinated beamforming (CS/CB) algorithm and a joint processing (JP) algorithm. The classification of the algorithm may be based on a type of information shared among the base stations 111, 112, and 113, and an amount of information. In the CS/BS algorithm, the base stations 111, 112, and 113 may not use inter-cell data sharing and may use only sharing of channel information. Even though the JP algorithm is assumed in the following examples, it should be understood that the CS/BS algorithm or other algorithms may also be employed.

For example, each of the terminals 121, 122, 123 may determine whether to feed back corresponding channel information based on a strength of a signal that is received from each of the base stations 111, 112, and 113. Each of the base stations 111, 112, and 113 may determine one or more terminals from among the terminals 121, 122, and 123 data is to be transmitted. In various examples, all of the connections may not exist between the base stations 111, 112, and 113 and the terminals 121, 122, and 123.

Local (L)-Signal to Leakage and Noise Ratio (SLNR) Based Beamforming Vector Design As shown in FIG. 1, because all of signals received from the base stations 111, 112, and 113 are effective, the terminal 121 may process all of the signals received from the base stations 111, 112, and 113. Because signals received from the base stations 112 and 113 are effective, the terminal 122 may process the signals received from the base stations 112 and 113. Because a signal received from the base station 113 is effective, the terminal 123 may process the signal received from the base station 113. Each of the terminals 121, 122, and 123 may feed back channel information to a corresponding base station. For example, each terminal may feed back, to corresponding base stations, channel information that is associated with channels that the base stations use to transmit signals to each of the terminals 121, 122, and 123.

For example, each base station may select terminals to be scheduled based on channel information fed back from the terminals, and may generate a precoding matrix, for example, a set of beamforming vectors to transmit data to the selected terminals at a highest possible data rate. For example, a signal transmitted from a base station through precoding may be received at the terminals and received signal vectors may be defined as follows:

$$\begin{bmatrix} y_1 \\ y_2 \\ y_3 \end{bmatrix} = \begin{bmatrix} H_{1,1} & H_{1,2} & H_{1,3} \\ H_{2,1} & H_{2,2} & H_{2,3} \\ H_{3,1} & H_{3,2} & H_{3,3} \end{bmatrix} \begin{bmatrix} v_{1,1} & 0 & 0 \\ v_{2,1} & v_{2,2} & 0 \\ v_{3,1} & v_{3,2} & v_{3,3} \end{bmatrix} \begin{bmatrix} s_1 \\ s_2 \\ s_3 \end{bmatrix} + \begin{bmatrix} n_1 \\ n_2 \\ n_3 \end{bmatrix}$$

In this example, $y_i \in C^M$ denotes a received signal vector of a terminal i, $H_{i,j} \in C^{N \times M}$ denotes a channel matrix formed from a base station j to the terminal i, $v_{i,j} \in C^M$ denotes a beamforming vector from a base station i to a terminal j, $S_i$ denotes a complex Gaussian coded symbol vector for the terminal i, and $n_i \in C^M$ denotes noise and interference against the terminal i, and covariance thereof is $\sigma_i^2 I$. Also, M denotes a number of transmit antennas installed in the base station, and N denotes a number of receive antennas installed in the terminal.

Even though information associated with channel matrices $H_{2,1}$, $H_{3,1}$, $H_{3,2}$ corresponds to substantially existing channel information, the terminal may not feed back information associated with the channel matrices $H_{2,1}$, $H_{3,1}$, $H_{3,2}$. For example, if a strength of a signal received at the terminal from the base station is less than a predetermined $\Gamma$, channel information may not be fed back. In this example, because the terminal may not feed back channel information to the base station, the base station may recognize a channel matrix corresponding to the channel information that is not fed back, as a zero matrix.

In this example, the following constraints may exist. First, each base station may employ a different power amplifier and thus, may have a different power constraint. Second, if a channel matrix is recognized as a zero matrix by the base station, there may be a constraint that the base station may not transmit a pilot because the base station uses a zero vector as a beamforming vector corresponding to the zero matrix.

In general, if K terminals are present, received signals vectors of the K terminals may be expressed according to Equation 1.

$$\begin{bmatrix} y_1 \\ y_2 \\ \vdots \\ y_K \end{bmatrix} = \begin{bmatrix} \sqrt{\rho_{1,1}}H_{1,1} & \sqrt{\rho_{2,1}}H_{2,1} & \cdots & \sqrt{\rho_{3,1}}H_{3,1} \\ \sqrt{\rho_{1,2}}H_{1,2} & \sqrt{\rho_{2,2}}H_{2,2} & \cdots & \sqrt{\rho_{3,2}}H_{3,2} \\ \vdots & \vdots & & \vdots \\ \sqrt{\rho_{1,K}}H_{1,K} & \sqrt{\rho_{1,K}}H_{2,K} & \cdots & \sqrt{\rho_{1,K}}H_{B,K} \end{bmatrix} \quad \text{[Equation 1]}$$

$$\begin{bmatrix} v_1 & v_{1,2} & \cdots & v_{1,K} \\ v_{2,1} & v_{2,2} & \cdots & v_{2,K} \\ \vdots & \vdots & \ddots & \vdots \\ v_{B,1} & v_{B,2} & \cdots & v_{B,K} \end{bmatrix} \begin{bmatrix} s_1 \\ s_2 \\ \vdots \\ s_K \end{bmatrix} + \begin{bmatrix} n_1 \\ n_2 \\ \vdots \\ n_K \end{bmatrix}$$

In Equation 1, $\rho_{i,j}$ denotes large-scale fading from the base station i to the terminal j, B denotes a number of cooperating base stations, K denotes a number of terminals being served, and $H_{i,j}$ denotes short term fading from the base station i to the terminal j. In this example, the power constraint at each base station may be expressed by, $$\|v_{i,1}\|^2 + \|v_{i,2}\|^2 + \ldots + \|v_{i,K}\|^2 \leq P, i=1, 2, \ldots, B$$

The terminal may apply a receive filter to a received signal vector. For example, if a transmission rank for each terminal is 1, a terminal k may apply the receive filter such as $z_k = g_k^H y_k$. In this example, $g_k$ denotes a receive combining vector of the receive filter that is employed by the terminal k, and may be designed using various schemes. For example, if the terminal is a maximal radio combining (MRC) receiver, all the channel information and information associated with all the beamforming vectors may be used to design $g_k$. For simplification, $g_k$ may be used as follows:

$$g_k \leftarrow u_{max}([\sqrt{\rho_{1,k}}H_{1,k}\sqrt{\rho_{2,k}}H_{2,k}\ldots\sqrt{\rho_{B,k}}H_{B,k}])$$
$$k=1, \ldots, K$$

In this example, $u_{max}(A)$ corresponds to a left singular vector of A matrix. Equation 1 may be expressed by Equation 2.

$$\begin{bmatrix} z_1 \\ z_2 \\ \vdots \\ z_K \end{bmatrix} = \begin{bmatrix} h_{1,1}^H & h_{2,1}^H & \cdots & h_{B,1}^H \\ h_{1,2}^H & h_{2,2}^H & \cdots & h_{B,2}^H \\ \vdots & \vdots & & \vdots \\ h_{1,K}^H & h_{2,K}^H & \cdots & h_{B,K}^H \end{bmatrix} \begin{bmatrix} v_{1,1} & v_{1,2} & \cdots & v_{1,K} \\ v_{2,1} & v_{2,2} & \cdots & v_{2,K} \\ \vdots & \vdots & \ddots & \vdots \\ v_{B,1} & v_{B,2} & \cdots & v_{B,K} \end{bmatrix} \quad \text{[Equation 2]}$$

$$\begin{bmatrix} s_1 \\ s_2 \\ \vdots \\ s_k \end{bmatrix} + \begin{bmatrix} \tilde{n}_1 \\ \tilde{n}_2 \\ \vdots \\ \tilde{n}_K \end{bmatrix}$$

In Equation 2, $h_{i,k}^H := \sqrt{\rho_{i,k}}g_k^H H_{i,k}$. According to the L-SLNR based beamforming vector design algorithm, the beamforming vector may be divided into a power component and a direction component as follows:

$$v_{i,k} = \sqrt{P_{i,k}}w_{i,k} (\|w_{i,k}\|=1)$$

The direction component of the beamforming vector may be computed according to the following equation:

$$w_{i,k} = \arg\max_{\|w\|=1} \frac{\beta_{i,k}|h_{i,k}^H w|^2}{\frac{\sigma_k^2}{P} + \sum_{\substack{j=1 \\ j \neq k}}^{K} \beta_{i,k}|h_{i,j}^H w|^2}$$

Hereinafter, for clarity of description, the number of base stations B may be assumed as three.

In this example, $\beta$ denotes a positive number satisfying $$\sum_{k=1}^{K} \beta_{i,k} = 1.$$

In this example, $\beta$ may be adjusted so that the beamforming vector may span pareto optimal values. Because a complex computation process may be used to optimize the direction component of the beamforming vector, the direction component of the beamforming vector may be briefly optimized by defining $\beta_{i,k}=1$ i=1, . . . , 3 k=1, . . . K. If the power component of the beamforming vector is fixed, the direction component of the beamforming vector may be computed according to Equation 3.

$$w_{i,k} = c_{i,k} \left( \frac{\sigma_k^2}{P} I + \sum_{\substack{j=1 \\ j \neq k}}^{K} h_{i,j} h_{i,j}^H \right)^{-1} h_{i,k} e^{j\theta_{i,k}} \quad \text{[Equation 3]}$$

$$= \overline{w}_{i,k} e^{j\theta_{i,k}}$$

In Equation 3, interference may be small due to $\overline{w}_{i,k}$, and a phase component $\{\theta_{i,k}\}$ may be obtained as follows:

$$\theta_{i,k} \leftarrow -\angle(h_{i,k}^H \overline{w}_{i,k}) \ i=1, 2, 3 \ k=1, \ldots, K$$

problem to obtain the power component of the beamforming vector may follow as:

$$\max_{P_{i,k}} \sum_{k=1}^{K} \log(1 + SINR_k)$$

$$\text{subject to } \sum_{k=1}^{K} P_{i,k} = P$$

$$i = 1, 2, 3$$

In this example, $SINR_k$ may be expressed by, $$SINR_k = \frac{\left| \sum_{i=1}^{3} \sqrt{P_{i,k}} h_{i,k}^H w_{i,k} \right|^2}{\sigma_k^2 + \sum_{\substack{j=1 \\ j \neq k}}^{K} \left| \sum_{i=1}^{3} \sqrt{P_{i,j}} h_{i,j}^H w_{i,j} \right|^2}$$

$$k = 1, \ldots, K$$

The interference may be relatively small in a low signal to noise ratio (SNR) or a high SNR, and thus, $SINR_k$ may be expressed by, $$SINR_k \approx \left| \sqrt{P_{i,k}} \frac{h_{i,k}^H w_{i,k}}{\sqrt{\sigma_k^2}} + \sum_{\substack{l=1 \\ l \neq i}}^{3} \frac{\sqrt{P_{l,k}} h_{l,k}^H w_{l,k}}{\sqrt{\sigma_k^2}} \right|^2$$

$$= \left| \sqrt{P_{i,k}} c_{i,k} + d_{i,k} \right|^2$$

$$c_{i,k} = \frac{h_{i,k}^H w_{i,k}}{\sqrt{\sigma_k^2}}, \quad d_{i,k} = \sum_{\substack{l=1 \\ l \neq i}}^{3} \frac{\sqrt{P_{l,k}} h_{l,k}^H w_{l,k}}{\sqrt{\sigma_k^2}}$$

The optimization of $SINR_k$ may correspond to the solving of a cubic equation and thus, $d_{i,k}=0$ may be assumed to compute the beamforming vector. The power component of the beamforming vector may be computed according to the following equation:

$$\sqrt{P_{i,k}} = \max\left(\alpha - \frac{1}{c_{i,k}^2}, 0\right)$$

In this example, $\alpha$ denotes a variable of a water-filling algorithm. If $d_{i,k} \neq 0$, the power component of the beamforming vector may be obtained as follows:

$$\sqrt{P_{i,k}} = \max\left(\sqrt[3]{a_{i,k} + \sqrt{a_{i,k}^2 + b_{i,k}^3}} - \frac{b_{i,k}}{\sqrt[3]{a_{i,k} + \sqrt{a_{i,k}^2 + b_{i,k}^3}}} - \frac{2d_{i,k}}{3c_{i,k}}, 0\right)$$

$$a_{i,k} = \frac{18 d_{i,k} + 2 d_{i,k}^3 + 9 \alpha c_{i,k}^2 d_{i,k}}{54 c_{i,k}^3}$$

$$b_{i,k} = \frac{3 - d_{i,k}^2}{9 c_{i,k}^2} - \frac{\alpha}{3}.$$

In this example, a bisection method using a high complexity may be applied to compute a lagrange multiplier $\alpha$. The bisection method is an example of an iterative method.

Enhancement of L-SLNR Based Beamforming Vector Design Method

For example, the throughput may be enhanced using two schemes in comparison to the above-described L-SLNR based beamforming vector design method.

Process 1: In the above-described L-SNLR based beamforming vector design method example, even though different noise and interference substantially occurs in each terminal, the different noise and difference may not be taken into consideration. As known from Equation 3, the L-SLNR based beamforming vector design method may use only noise and interference experienced at the terminal k. For example, the terminal k may use only $\sigma_k^2$. However, because each terminal has different noise and interference, the affect of the beamforming vector of the terminal k with respect to another terminal m, $m \neq k$ may be different. Accordingly, to properly determine noise and interference in each terminal, noise and interference of all terminals may be considered. In this example, reception end normalization may be used. The reception end normalization may be achieved by expressing a channel vector as follows:

$$\tilde{h}_{i,k} = \sqrt{\frac{\sigma_{ref}^2}{\sigma_k^2}} h_{i,k}$$

In this example, $\sigma_{ref}^2$ denotes a predetermined positive number. For clarity of description, $\sigma_{ref}^2 = 1$ may be assumed. Accordingly, the direction component of the beamforming vector may be modified as follows:

$$w_{i,k} = \arg\max_{\|w\|^2=1} \frac{|h_{i,k}^H w|^2 / \sigma_k^2}{\frac{1}{P} + \sum_{\substack{j=1 \\ j \neq k}}^{K} (|h_{i,j}^H w|^2 / \sigma_j^2)}$$

In this example, a direction component of a new beamforming vector may be generated based on noise and interference of the terminal and noise and interference of another terminal. Accordingly, the L-SLNR based beamforming vector design method may be improved.

Process 2: Optimization of the power component of the beamforming vector may also be improved. For example, even though the L-SLNR based beamforming vector design method uses the entire power of the base station, a value obtained by dividing the entire power by a number of terminals connected to the base station may be used rather than the entire power of the base station. Accordingly, the direction component of the beamforming vector may be optimized according to the following equation.

$$w_{i,k} = \arg\max_{\|w\|^2=1} \frac{|h_{i,k}^H w|^2 / \sigma_k^2}{\frac{K_i}{P} + \sum_{\substack{j=1 \\ j \neq k}}^{K} |h_{i,j}^H w|^2 / \sigma_j^2}$$

Global (G)-SLNR Based Beamforming Vector Design Method

The L-SLNR based beamforming vector design method may be enhanced through processes 1 and 2. However, the enhanced or original L-SLNR based beamforming vector design method may use only channel information of a terminal that is connected to each base station, and thus, each base station may independently design a beamforming vector. That is, cooperation between base stations may not be performed during a process of designing the beamforming vector.

If the number of transmit antennas installed at the base station is greater than the number of terminals being served, the L-SLNR based beamforming vector design method may have a low throughput. Accordingly, proposed is a G-SLNR based beamforming vector design method.

Equation 2 may be expressed as follows:

$$y_k = \sum_{l \in S_{MSk}^{BS}} \sqrt{\rho_{l,k}} \tilde{h}_{l,k}^H x_l + n_k$$

$$\tilde{h}_{l,k} = \begin{cases} 0_4, & \text{if } \frac{\rho_{l,k}}{\rho_k^{max}} < \Gamma \\ g_k^H H_{l,k}, & \text{otherwise} \end{cases}$$

In this example, $\rho_{i,k}$ denotes large scale fading between the base station i and the terminal k, and $\rho_k^{max} = \max\{\rho_{1,k}, \ldots, \rho_{B,k}\}$.

To further illustrate the G-SLNR based beamforming vector design method, the following definition may be made: $S_{BSl}^{MS}$ denotes a set of terminals connected to a base station 1 and $S_{MSk}^{BS}$ denotes a set of base stations connected to the terminal k. Using this, a signal received at the terminal k may be expressed by Equation 4.

$$y_k = \left(\sum_{l \in S_{MSk}^{BS}} \sqrt{\rho_{l,k}}\, \tilde{h}_{l,k}^H v_{l,k}\right) s_k + \sum_{m \neq k}\left(\sum_{l \in S_{MSm}^{BS}} \sqrt{\rho_{l,k}}\, \tilde{h}_{l,k}^H v_{l,m}\right) s_m + n_k \quad \text{[Equation 4]}$$

If the reception end normalization is applied using a normalization factor $$\beta_k = \frac{\sigma_{ref}^2}{\sigma_k^2},$$

Equation 5 may be expressed by $$z_k = \left(\sum_{l \in S_{MSk}^{BS}} \sqrt{\beta_k \rho_{l,k}}\, \tilde{h}_{l,k}^H v_{l,k}\right) s_k + \sum_{m \neq k}\left(\sum_{l \in S_{MSm}^{BS}} \sqrt{\beta_k \rho_{l,k}}\, \tilde{h}_{l,k}^H v_{l,m}\right) s_m + \tilde{n}_k$$

Accordingly, all the terminals may become aware of that $E|\tilde{n}_k|^2 = \sigma_{ref}^2$ is established.

To define G-SLNR, a leakage channel associated with interference that occurs in a terminal m due to a beamforming vector of the terminal k may be defined.

$$\bar{h}_m^k = \left[\sqrt{\beta_m \rho_{i_1^k,m}}\, \tilde{h}_{i_1^k,m}^H \cdots \sqrt{\beta_m \rho_{i_{|S_{MSk}^{BS}|}^k,m}}\, \tilde{h}_{i_{|S_{MSk}^{BS}|}^k,m}^H\right]^H \quad \text{[Equation 5]}$$

$$= \sigma_{ref}\left[\sqrt{\frac{\rho_{i_1^k,m}}{\sigma_k^2}}\, \tilde{h}_{i_1^k,m}^H \cdots \sqrt{\frac{\rho_{i_{|S_{MSk}^{BS}|}^k,m}}{\sigma_k^2}}\, \tilde{h}_{i_{|S_{MSk}^{BS}|}^k,m}^H\right]^H$$

$$= \sigma_{ref}\left[\sqrt{CQI_{i_1^k,m}}\, \tilde{h}_{i_1^k,m}^H \cdots \sqrt{CQI_{i_{|S_{MSk}^{BS}|}^k,m}}\, \tilde{h}_{i_{|S_{MSk}^{BS}|}^k,m}^H\right]^H$$

In Equation 5, a signal to noise-plus-other cell interference between a base station $i_1^k$ and the terminal m may be defined as $CQI_{i_1^k,m}$.

An accumulated beamforming vector for the terminal k with respect to a plurality of base stations may be defined as follows:

$$v_k = \left[v_{i_1^k,k}^H \cdots v_{i_{|S_{MSk}^{BS}|}^k,k}^H\right]^H = \sqrt{P_k}\, w_k$$

In this example, $\|w_k\|^2 = 1$ may be satisfied. Using the beamforming vector and the leakage channel, an SLNR of the terminal k may be defined as follows:

$$SLNR_k = \frac{P_k |\bar{h}_k^{kH} w_k|^2}{\sigma_{ref}^2 + P_k \sum_{m \neq k} |\bar{h}_m^{kH} w_k|^2}$$

$$= \frac{|\bar{h}_k^{kH} w_k|^2}{\frac{\sigma_{ref}^2}{P_k} + \sum_{m \neq k} |\bar{h}_m^{kH} w_k|^2}$$

A beamforming vector to optimize the G-SLNR may be computed according to Equation 6.

$$w_k = \underset{\|w_k\|^2=1}{\text{argmax}}\, SLNR_k = c_k\left(\frac{\sigma_{ref}^2}{P_k} I + \sum_{m \neq k} \bar{h}_m^k \bar{h}_m^{kH}\right)^{-1} \bar{h}_k^k \quad \text{[Equation 6]}$$

$$(c_k \text{ s.t. } \|w_k\| = 1)$$

In Equation 6, the optimized power $P_k$ may be based on the direction component of the beamforming vector and the beamforming vector may be based on the power component $P_k$. For example, an iterative optimization method may be used to optimize the direction component and the power component of the beamforming vector. However, the above method may include a high complexity, and thus, the following method is proposed.

For example, the power component may be computed using the enhanced L-SLNR based beamforming vector design method and the computed power component may be used.

That is, $$P_k^{L-SLNR} \leftarrow \sum_{l \in S_{MSk}^{BS}} \|v_{l,k}^{L-SLNR}\|^2.$$

In this example, if Equation 5 is rewritten, Equation 7 may be obtained.

$$w_k = c_k\left(\frac{\sigma_{ref}^2}{P_k^{L-SLNR}} I + \sum_{m \neq k} \bar{h}_m^k \bar{h}_m^{kH}\right)^{-1} \bar{h}_k^k \quad \text{[Equation 7]}$$

$$(c_k \text{ s.t. } \|w_k\| = 1)$$

In compliance with the power constraint of each base station, a largest value among powers consumed by base stations may be selected and the entire beamforming vectors may be divided by the selected largest value. This expression may be expressed as follows:

$$v_{i_l^k,k} \leftarrow v_k(M(l-1)+1 : Ml) \text{ for } l = 1, \ldots, |S_{MSk}^{BS}|$$

$$v_{i,m} \leftarrow \sqrt{\frac{P}{\max_{l \in \{1,2,\ldots,B\}}\left\{\sum_{k \in S_{BSl}^{MS}} \|v_{l,k}\|^2\right\}}}\, v_{i,m} \quad \forall\, i, m$$

For example, the G-SLNR based beamforming vector design method may be summarized as follows:

(1) Compute a unique normalization factor of each of the terminals by normalizing a predetermined reference value using unique noise power occurring in each of the terminals.

$$\beta_k \leftarrow \frac{\sigma_{ref}^2}{\sigma_k^2} \quad \forall k \in \{1, \ldots, K\}$$

(2) Compute a leakage channel of each of the terminals via which interference occurs in each of other terminals due to a beamforming vector for each of the terminals, using the unique normalization factor of each of the terminals.

$$\tilde{h}_m^k \leftarrow \left[ \sqrt{\beta_m \rho_{i_1^k,m}} \tilde{h}_{i_1^k,m}^H \cdots \sqrt{\beta_m \rho_{i_{|S_{MSk}^{BS}|}^k,m}} \tilde{h}_{i_{|S_{MSk}^{BS}|}^k,m}^H \right]^H$$

$$\forall k, m \in \{1, \ldots, K\}$$

(3) Compute first beamforming vectors for each of the terminals without using noise power that occurs in each of the other terminals with respect to each of the terminals. For example, the first beamforming vectors may be computed using the L-SLNR based beamforming vector design method.

$$\{v_{l,k}^{L\text{-}SLNR}\}$$

(4) Compute a sum of first powers of the first beamforming vectors induced using the L-SLNR based beamforming vector design method. For example, the sum of first powers may refer to a power component of a beamforming vector that is determined using the G-SLNR based beamforming vector design method. As described herein, the power component of the beamforming vector may be readjusted, for example, to comply with the power constraint of each base station.

$$P_k^{L\text{-}SLNR} \leftarrow \sum_{l \in S_{MSk}^{BS}} \|v_{l,k}^{L\text{-}SLNR}\|^2 \quad \forall k \in \{1, \ldots, K\}.$$

(5) Compute a direction component $W_k$ of the beamforming vector that is determined using the G-SLNR based beamforming vector design method, based on the sum of first powers and the leakage channel.

$$w_k = c_k \left( \frac{\sigma_{ref}^2}{P_k^{L\text{-}SLNR}} I + \sum_{m \neq k} \tilde{h}_m^k \tilde{h}_m^{kH} \right)^{-1} \tilde{h}_k^k$$

$$(c_k \text{ s.t.} \|w_k\| = 1)$$

$$\forall k \in \{1, \ldots, K\}$$

(6) Compute a beamforming vector $V_k$ that is determined using the G-SLNR based beamforming vector design method, based on the sum of first powers and $W_k$.

$$v_k = \sqrt{P_k^{L\text{-}SLNR}} w_k$$

(7) Readjust $V_k$ through the following process to comply with the power constraint of each base station:

for $k \in \{1, \ldots, K\}$ $$v_{i_l^k,k} \leftarrow v_k(M(l-1)+1:Ml) \quad \forall l \in \{1, \ldots, |S_{MSk}^{BS}|\}$$

end $$\gamma \leftarrow \sqrt{\frac{P}{\max_{l \in \{1,2,\ldots,B\}} \left\{ \sum_{k \in S_{BSl}^{MS}} \|v_{l,k}\|^2 \right\}}}$$

$$v_{l,k} \leftarrow \gamma v_{l,k} \quad \forall l, k$$

In this example, γ denotes a scaling factor that enables the power constraint of each base station to be complied with.

Figure 2:
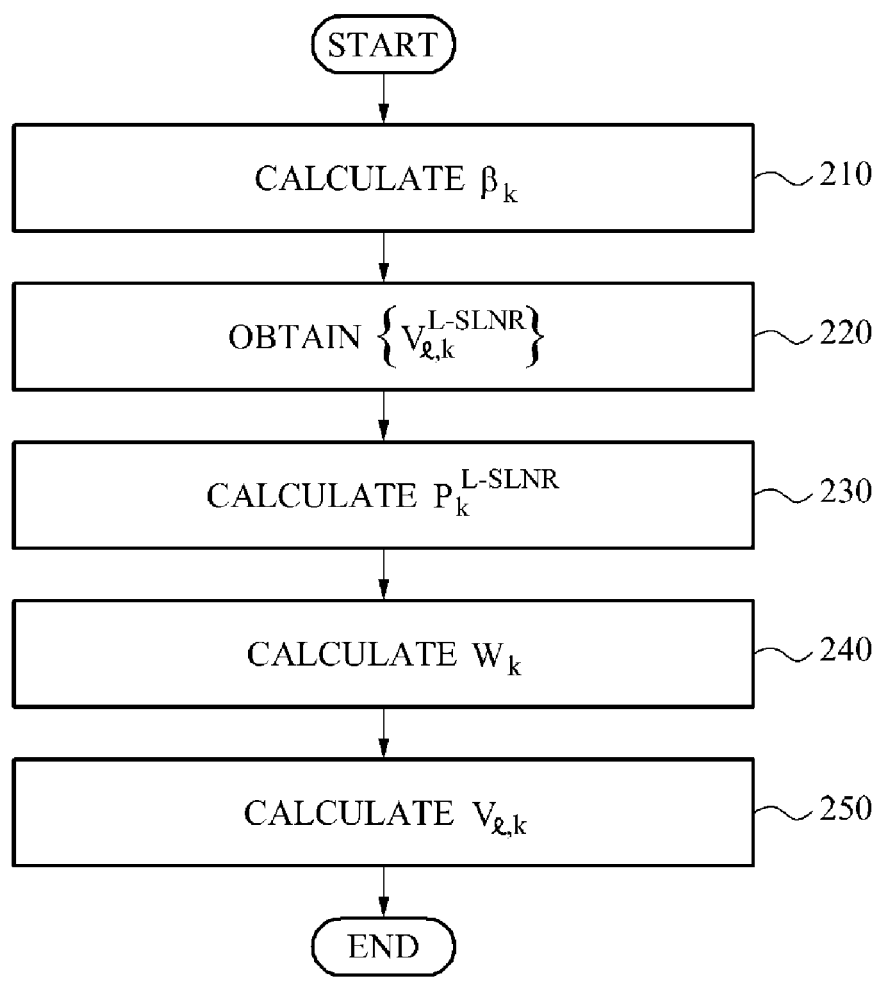
FIG. 2 is a flowchart illustrating an example of a method of determining a beamforming vector.

FIG. 2 illustrates an example of a method of determining a beamforming vector.

Referring to FIG. 2, in 210, the beamforming vector determining method computes a unique normalization factor $$\beta_k \leftarrow \frac{\sigma_{ref}^2}{\sigma_k^2} \quad \forall k \in \{1, \ldots, K\}$$

of each of terminals by normalizing a predetermined reference value using a unique noise power that occurs in each of the terminals.

In this example, interference occurs in each of the other terminals due to a beamforming vector for each of the terminals. According to the following equation, the beamforming vector determining method may compute a leakage channel of each of the terminals, using the unique normalization factor of each of the terminals.

$$\tilde{h}_m^k \leftarrow \left[ \sqrt{\beta_m \rho_{i_1^k,m}} \tilde{h}_{i_1^k,m}^H \cdots \sqrt{\beta_m \rho_{i_{|S_{MSk}^{BS}|}^k,m}} \tilde{h}_{i_{|S_{MSk}^{BS}|}^k,m}^H \right]^H$$

$$\forall k, m \in \{1, \ldots, K\}$$

For example, the beamforming vector determining method may determine the beamforming vector for each of the terminals with respect to the base stations based on the leakage channel of each of the terminals, and particularly, may determine the beamforming vector for each of the terminals to maximize or increase an SLNR of each of the terminals. Even though not shown in FIG. 2, $SLNR_k$ of the terminal k may be computed and $W_k$ may be determined to maximize or increase $SLNR_k$. In this example, a high complexity is used to determine $W_k$ so that $SLNR_k$ may be maximized. Accordingly, the required high complexity may decrease by employing first beamforming vectors according to G-SLNR based beamforming vector design method.

For example, as shown in FIG. 2, in 220, the beamforming vector determining method obtains first beamforming vectors $\{v_{l,k}^{L\text{-}SLNR}\}$ according to the L-SLNR based beamforming vector design method.

In 230, the beamforming vector determining method computes a sum of first powers of the first beamforming vectors that is induced using a G-SLNR based beamforming vector design method.

$$P_k^{L\text{-}SLNR} \leftarrow \sum_{l \in S_{MSk}^{BS}} \|v_{l,k}^{L\text{-}SLNR}\|^2 \quad \forall k \in \{1, \ldots, K\}.$$

In 240, the beamforming vector determining method briefly computes a direction component $W_k$ of the beamforming vector based on the sum of first powers and the leakage channel.

$$w_k = c_k \left( \frac{\sigma_{ref}^2}{P_k^{L\text{-}SLNR}} I + \sum_{m \neq k} \tilde{h}_m^k \tilde{h}_m^{kH} \right)^{-1} \tilde{h}_k^k$$

$$(c_k \text{ s.t.} \|w_k\| = 1)$$

$$\forall k \in \{1, \ldots, K\}$$

In 250, the beamforming vector determining method obtains a scaling factor γ in compliance with the power constraint of each base station and computes an optimal $V_{l,k}$.

Figure 3:
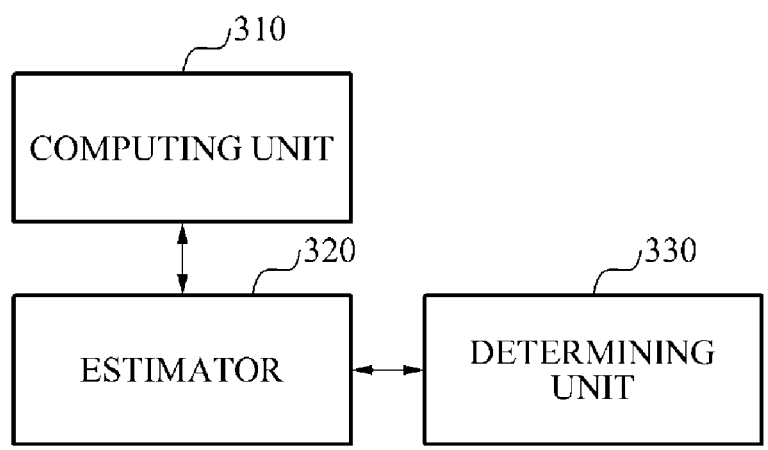
FIG. 3 is a diagram illustrating an example of a communication apparatus for determining a beamforming vector.

FIG. 3 illustrates an example of a communication apparatus to determine a beamforming vector.

Referring to FIG. 3, the communication apparatus includes a computing unit 310, an estimator 320, and a determining unit 330.

The computing unit 310 may compute a unique normalization factor of each of the respective terminals, for example, by normalizing a predetermined reference value using noise power that occurs in each of the terminals.

The estimator 320 may estimate a leakage channel of each of the terminals in which interference occurs due to a beamforming vector corresponding to each of the terminals, using the unique normalization factor of each of the terminals.

The determining unit 330 may determine the beamforming vector for each of the terminals with respect to the whole plurality of base stations based on the leakage channel of each of the terminals.

The examples described herein with reference to FIG. 1 and FIG. 2 are applicable as is to the communication apparatus of FIG. 3.

For example, to employ the aforementioned methods, the following feedback information may be transmitted from the terminal to the base station:

Channel quality indicator (CQI) and a precoding matrix indicator (PMI)

Channel information of a serving base station that is defined in a 3rd Generation Partnership Project (3GPP) Long Term Evolution (LTE) standard.

Channel information of another base station that is defined in a 3GPP LTE-Advanced standard. The terminal may process a signal from the other base station as a desired signal and process, as an interference signal, a signal from other base stations excluding the other base station.

Additional inter-cell CSI for coherent joint processing (defined as PHASE)

To adjust phase information among CoMP transmission points, PHASE information among channels of base stations may be fed back for coherent cooperation communication.

Additional information for "Regularized BF": Define additional feedback information (defined as CoMP_CQI). The additional information may be fed back using various schemes based on the following options:

Option 1) CQIs of each eNB assuming CoMP transmission
Option 2) Delta CQIs of each eNB assuming CoMP transmission Aperiodic CQI/Precoding Matrix Indicator (PMI)/Rank Indicator (RI) Reporting Using PUSCH In a system, for example, a system according to 3GPP Rel. 8 of the 3GPP LTE standard, a terminal may feed back, to a base station, an RI and CQI and PMI corresponding to the RI according to a scheme semi-statically defined in a higher layer. The terminal may employ one of the reporting modes as shown in Table 1 that is defined in a TS 36.213 standard.

TABLE 1

CQI and PMI Feedback Types for PUSCH Rel. 8 Reporting Modes

| | | PMI Feedback Type | | |
|---|---|---|---|---|
| | | No PMI | Single PMI | Multiple PMI |
| PUSCH CQI Feedback Type | Wideband (wideband CQI) | | | Mode 1-2 |
| | UE Selected (subband CQI) | Mode 2-0 | | Mode 2-2 |

TABLE 1-continued

CQI and PMI Feedback Types for PUSCH Rel. 8 Reporting Modes

| | | PMI Feedback Type | | |
|---|---|---|---|---|
| | | No PMI | Single PMI | Multiple PMI |
| | Higher Layer-configured (subband CQI) | Mode 3-0 | Mode 3-1 | |

For example, a terminal may transmit CQI, PMI, an RI, and PHASE, and CoMP_CQI using the same physical uplink shared channel (PUSCH). PHASE and CoMP_CQI may be jointly encoded or may be individually encoded.

Rel. 10 of the 3GPP LTE-Advanced standard, for example discloses a new feedback framework based on matrices W1 and W2. In the feedback framework, PHASE and CoMP_CQI may be jointly encoded together with the R1 and W1/W2, or may be encoded separately from the R1 and W1/W2.

Periodic CQI/PMI/RI Reporting Using PUCCH

In 3GPP Rel. 8, for example, a terminal may periodically feed back, to a base station, an RI and CQI and PMI corresponding to the RI according to a scheme semi-statically defined in a higher layer. The terminal may employ one of reporting modes as shown in Table 2 that is defined in a TS 36.213 standard.

TABLE 2

CQI and PMI Feedback Types for PUCCH Rel. 8 Reporting Modes

| | | PMI Feedback Type | |
|---|---|---|---|
| | | No PMI | Single PMI |
| PUCCH CQI Feedback | Wideband (wideband CQI) | Mode 1-0 | Mode 1-1 |
| | UE Selected (subband CQI) | Mode 2-0 | Mode 2-1 |

For example, the probable candidate reporting modes in a physical uplink control channel (PUCCH) are proposed. In general, two methods are proposed. One method includes a PMI and the other method includes only a CoMP_CQI.

PHASE and CoMP_CQI as well as CQI and PMI may include information that is associated with at least one interference base station. For example, CQI/PMI_cell1, CQI/PMI_cell2, and the like, may be fed back. In this example, cell1 and cell2 may correspond to interference cells, for example, interference base stations. If a single PHASE and CoMP_CQI are fed back, the single PHASE and CoMP_CQI may be used as channel information of all the interference base stations as a representative value.

Various examples may operate together with all the PMI feedback types. For example, the PMI feedback types may be divided into a case in which PMI is not fed back, for example, Mode 1-0 and Mode 2-0, and a case in which PMI is fed back, for example, Mode 1-1 and Mode 2-1, which will be further described. Hereinafter, with respect to the above two cases, 1) an example in which CQI from an independent base station is fed back and 2) an example in which CQI from the independent base station is fed back together with CoMP_CQI are described.

"A∥B" indicates that A and B may be fed back in separate subframes. "A, B" indicates that A and B may be jointly encoded or be individually encoded.

A. No PMI Feedback

TABLE 3

| PMI feedback Type (No PMI, PMI) | CoMP JP CQI information | subband/no subband report | W1/W2 in same or separate subframes | W2_s/W2_w | reporting modes<br>CQI_w_k: wideband CQI of k-th cell<br>CQI_s_k: subband CQI of k-th cell<br>CQI_wd_k: wideband diff. CQI for CoMP JP of k-th cell<br>CQI_sd_k: subband diff. CQI for CoMP JP of k-th cell |
|---|---|---|---|---|---|
| No PMI | Individual CQI report only | No subband report | NA | NA | RI_k ‖ CQI_w_k |
|  |  | subband report (CQI) |  |  | RI_k ‖ CQI_w_k ‖ CQI_s_k |
|  | Individual CQI + differential CQI report | No subband report | NA | NA | RI_k ‖ CQI_w_k, CQI_wd_k<br>RI_k ‖ CQI_w_k ‖ CQI_wd_k |
|  |  | subband report (CQI) |  |  | RI_k ‖ CQI_w_k, CQI_wd_k ‖ CQI_s_k<br>RI_k ‖ CQI_w_k, CQI_wd_k ‖ CQI_s_k, CQI_sd_k<br>RI_k ‖ CQI_w_k, CQI_wd_k ‖ CQI_s_k ‖ CQI_sd_k<br>RI_k ‖ CQI_w_k ‖ CQI_s_k ‖ CQI_wd_k<br>RI_k ‖ CQI_w_k ‖ CQI_s_k ‖ CQI_wd_k, CQI_sd_k<br>RI_k ‖ CQI_w_k ‖ CQI_s_k ‖ CQI_wd_k ‖ CQI_sd_k |

B. PMI Feedback

TABLE 4

| MI feedback Type (No PMI, PMI) | CoMP JP CQI information | subband/no subband report | W1/W2 in same or separate subframes | W2_s/W2_w | reporting modes<br>CQI_w_k: wideband CQI of k-th cell<br>CQI_s_k: subband CQI of k-th cell<br>CQI_wd_k: wideband diff. CQI for CoMP JP of k-th cell<br>CQI_sd_k: subband diff. CQI for CoMP JP of k-th cell |
|---|---|---|---|---|---|
| MI | Individual CQI report only | No subband report | W1 and W2 in separate subframes | W2_w | RI_k ‖ W1_k ‖ W2_w_k, CQI_w_k ‖ PHASE<br>RI_k ‖ W1_k ‖ W2_w_k, CQI_w_k, PHASE<br>RI_k ‖ W1_k, PHASE ‖ W2_w_k, CQI_w_k<br>RI_k, PHASE ‖ W1_k ‖ W2_w_k, CQI_w_k<br>RI_k, W1_k ‖ W2_w_k, CQI_w_k ‖ PHASE<br>RI_k, W1_k ‖ W2_w_k, CQI_w_k, PHASE<br>RI_k, W1_k, PHASE ‖ W2_w_k, CQI_w_k |
|  |  |  | W1 and W2 in same subframe | W2_w | RI_k ‖ W1_k, W2_w_k ‖ CQI_w_k ‖ PHASE<br>RI_k ‖ W1_k, W2_w_k ‖ CQI_w_k, PHASE<br>RI_k ‖ W1_k, W2_w_k, PHASE ‖ CQI_w_k<br>RI_k, PHASE ‖ W1_k, W2_w_k ‖ CQI_w_k<br>RI_k ‖ W1_k, W2_w_k, CQI_w_k ‖ PHASE<br>RI_k ‖ W1_k, W2_w_k, CQI_w_k, PHASE<br>RI_k, PHASE ‖ W1_k, W2_w_k, CQI_w_k<br>RI_k, W1_k, W2_w_k ‖ CQI_w_k ‖ PHASE<br>RI_k, W1_k, W2_w_k ‖ CQI_w_k, PHASE<br>RI_k, W1_k, W2_w_k, PHASE ‖ CQI_w_k |

TABLE 4-continued

| MI feedback Type (No PMI, PMI) | CoMP JP CQI information | subband/ no subband report | W1/W2 in same or separate subframes | W2_s/W2_w | reporting modes CQI_w_k: wideband CQI of k-th cell CQI_s_k: subband CQI of k-th cell CQI_wd_k: wideband diff. CQI for CoMP JP of k-th cell CQI_sd_k: subband diff. CQI for CoMP JP of k-th cell |
|---|---|---|---|---|---|
| | | subband report (CQI and/or W2) | W1 and W2 in separate subframes | W2_w | RI_k, W1_k \|\| W2_w_k, CQI_w_k \|\| CQI_s_k \|\| PHASE RI_k, W1_k \|\| W2_w_k, CQI_w_k \|\| CQI_s_k, PHASE RI_k, W1_k \|\| W2_w_k, CQI_w_k, PHASE \|\| CQI_s_k RI_k, W1_k, PHASE \|\| W2_w_k, CQI_w_k \|\| CQI_s_k RI_k \|\| W1_k \|\| W2_w_k, CQI_w_k \|\| CQI_s_k \|\| PHASE RI_k \|\| W1_k \|\| W2_w_k, CQI_w_k \|\| CQI_s_k, PHASE RI_k \|\| W1_k \|\| W2_w_k, CQI_w_k, PHASE \|\| CQI_s_k RI_k \|\| W1_k, PHASE \|\| W2_w_k, CQI_w_k \|\| CQI_s_k RI_k, PHASE \|\| W1_k \|\| W2_w_k, CQI_w_k \|\| CQI_s_k RI_k \|\| W1_k, CQI_w_k \|\| W2_w_k, CQI_s_k \|\| PHASE RI_k \|\| W1_k, CQI_w_k \|\| W2_w_k, CQI_s_k, PHASE RI_k \|\| W1_k, CQI_w_k, PHASE \|\| W2_w_k, CQI_s_k RI_k, PHASE \|\| W1_k, CQI_w_k \|\| W2_w_k, CQI_s_k |
| | | | | W2_s | RI_k, W1_k \|\| W2_w_k, CQI_w_k \|\| W2_s_k, CQI_s_k \|\| PHASE RI_k, W1_k \|\| W2_w_k, CQI_w_k \|\| W2_s_k, CQI_s_k, PHASE RI_k, W1_k \|\| W2_w_k, CQI_w_k, PHASE \|\| W2_s_k, CQI_s_k RI_k, W1_k, PHASE \|\| W2_w_k, CQI_w_k \|\| W2_s_k, CQI_s_k RI_k \|\| W1_k \|\| W2_w_k, CQI_w_k \|\| W2_s_k, CQI_s_k \|\| PHASE RI_k \|\| W1_k \|\| W2_w_k, CQI_w_k \|\| W2_s_k, CQI_s_k, PHASE RI_k \|\| W1_k \|\| W2_w_k, CQI_w_k, PHASE \|\| W2_s_k, CQI_s_k RI_k \|\| W1_k, PHASE \|\| W2_w_k, CQI_w_k \|\| W2_s_k, CQI_s_k RI_k, PHASE \|\| W1_k \|\| W2_w_k, CQI_w_k \|\| W2_s_k, CQI_s_k RI_k \|\| W1_k, W2_w_k, CQI_w_k \|\| W2_s_k, CQI_s_k \|\| PHASE RI_k \|\| W1_k, W2_w_k, CQI_w_k \|\| W2_s_k, CQI_s_k, PHASE RI_k \|\| W1_k, W2_w_k, CQI_w_k, PHASE \|\| W2_s_k, CQI_s_k RI_k, PHASE \|\| W1_k, W2_w_k, CQI_w_k \|\| W2_s_k, CQI_s_k RI_k \|\| W1_k, CQI_w_k \|\| W2_s_k, CQI_s_k \|\| PHASE RI_k \|\| W1_k, CQI_w_k \|\| W2_s_k, CQI_s_k, PHASE RI_k \|\| |

TABLE 4-continued

| MI feedback Type (No PMI, PMI) | CoMP JP CQI information | subband/ no subband report | W1/W2 in same or separate subframes | W2_s/W2_w | reporting modes CQI_w_k: wideband CQI of k-th cell CQI_s_k: subband CQI of k-th cell CQI_wd_k: wideband diff. CQI for CoMP JP of k-th cell CQI_sd_k: subband diff. CQI for CoMP JP of k-th cell |
|---|---|---|---|---|---|
| | | | W1 and W2 in same subframe | W2_w | W1_k, CQI_w_k, PHASE ∥ W2_s_k, CQI_s_k RI_k, PHASE ∥ W1_k, CQI_w_k ∥ W2_s_k, CQI_s_k RI_k ∥ W1_k, W2_w_k ∥ CQI_w_k ∥ CQI_s_k ∥ PHASE RI_k ∥ W1_k, W2_w_k ∥ CQI_w_k ∥ CQI_s_k, PHASE RI_k ∥ W1_k, W2_w_k ∥ CQI_w_k, PHASE ∥ CQI_s_k RI_k ∥ W1_k, W2_w_k, PHASE ∥ CQI_w_k ∥ CQI_s_k RI_k, PHASE ∥ W1_k, W2_w_k ∥ CQI_w_k ∥ CQI_s_k RI_k ∥ W1_k, W2_w_k, CQI_w_k ∥ CQI_s_k ∥ PHASE RI_k ∥ W1_k, W2_w_k, CQI_w_k ∥ CQI_s_k, PHASE RI_k ∥ W1_k, W2_w_k, CQI_w_k, PHASE ∥ CQI_s_k RI_k, PHASE ∥ W1_k, W2_w_k, CQI_w_k ∥ CQI_s_k RI_k, W1_k, W2_w_k ∥ CQI_w_k ∥ CQI_s_k ∥ PHASE RI_k, W1_k, W2_w_k ∥ CQI_w_k ∥ CQI_s_k, PHASE RI_k, W1_k, W2_w_k ∥ CQI_w_k, PHASE ∥ CQI_s_k RI_k, W1_k, W2_w_k, PHASE ∥ CQI_w_k ∥ CQI_s_k |
| | Individual CQI + differential CQI report | No subband report | W1 and W2 in separate subframes | W2_w | RI_k, W1_k ∥ W2_w_k, CQI_w_k, CQI_wd_k ∥ PHASE RI_k, W1_k ∥ W2_w_k, CQI_w_k, CQI_wd_k, PHASE RI_k, W1_k, PHASE ∥ W2_w_k, CQI_w_k, CQI_wd_k RI_k, W1_k ∥ W2_w_k, CQI_w_k ∥ CQI_wd_k ∥ PHASE RI_k, W1_k ∥ W2_w_k, CQI_w_k ∥ CQI_wd_k, PHASE RI_k, W1_k ∥ W2_w_k, CQI_w_k, PHASE ∥ CQI_wd_k RI_k, W1_k, PHASE ∥ W2_w_k, CQI_w_k ∥ CQI_wd_k RI_k ∥ W1_k ∥ W2_w_k, CQI_w_k, CQI_wd_k ∥ PHASE RI_k ∥ W1_k ∥ W2_w_k, CQI_w_k, CQI_wd_k, PHASE RI_k ∥ W1_k, PHASE ∥ W2_w_k, CQI_w_k, CQI_wd_k RI_k, PHASE ∥ W1_k ∥ W2_w_k, CQI_w_k, CQI_wd_k RI_k ∥ W1_k ∥ W2_w_k, CQI_w_k ∥ CQI_wd_k ∥ PHASE RI_k ∥ W1_k ∥ W2_w_k, CQI_w_k ∥ CQI_wd_k, PHASE RI_k ∥ W1_k ∥ W2_w_k, CQI_w_k, PHASE ∥ CQI_wd_k |

TABLE 4-continued

| MI feedback Type (No PMI, PMI) | CoMP JP CQI information | subband/ no subband report | W1/W2 in same or separate subframes | W2_s/W2_w | reporting modes CQI_w_k: wideband CQI of k-th cell CQI_s_k: subband CQI of k-th cell CQI_wd_k: wideband diff. CQI for CoMP JP of k-th cell CQI_sd_k: subband diff. CQI for CoMP JP of k-th cell |
|---|---|---|---|---|---|
| | | | W1 and W2 in same subframe | W2_w | RI_k ∥ W1_k, PHASE ∥ W2_w_k, CQI_w_k ∥ CQI_wd_k<br>RI_k, PHASE ∥ W1_k ∥ W2_w_k, CQI_w_k ∥ CQI_wd_k<br>RI_k ∥ W1_k, W2_w_k ∥ CQI_w_k, CQI_wd_k ∥ PHASE<br>RI_k ∥ W1_k, W2_w_k ∥ CQI_w_k, CQI_wd_k, PHASE<br>RI_k ∥ W1_k, W2_w_k, PHASE ∥ CQI_w_k, CQI_wd_k<br>RI_k, PHASE ∥ W1_k, W2_w_k ∥ CQI_w_k, CQI_wd_k<br>RI_k ∥ W1_k, W2_w_k ∥ CQI_w_k ∥ CQI_wd_k ∥ PHASE<br>RI_k ∥ W1_k, W2_w_k ∥ CQI_w_k ∥ CQI_wd_k, PHASE<br>RI_k ∥ W1_k, W2_w_k ∥ CQI_w_k, PHASE ∥ CQI_wd_k<br>RI_k ∥ W1_k, W2_w_k, PHASE ∥ CQI_w_k ∥ CQI_wd_k<br>RI_k, PHASE ∥ W1_k, W2_w_k ∥ CQI_w_k ∥ CQI_wd_k<br>RI_k ∥ W1_k, W2_w_k, CQI_w_k, CQI_wd_k ∥ PHASE<br>RI_k ∥ W1_k, W2_w_k, CQI_w_k, CQI_wd_k, PHASE<br>RI_k, PHASE ∥ W1_k, W2_w_k, CQI_w_k, CQI_wd_k<br>RI_k ∥ W1_k, W2_w_k, CQI_w_k ∥ CQI_wd_k ∥ PHASE<br>RI_k ∥ W1_k, W2_w_k, CQI_w_k ∥ CQI_wd_k, PHASE<br>RI_k ∥ W1_k, W2_w_k, CQI_w_k, PHASE ∥ CQI_wd_k<br>RI_k, PHASE ∥ W1_k, W2_w_k, CQI_w_k ∥ CQI_wd_k<br>RI_k, W1_k, W2_w_k ∥ CQI_w_k, CQI_wd_k ∥ PHASE<br>RI_k, W1_k, W2_w_k ∥ CQI_w_k, CQI_wd_k, PHASE<br>RI_k, W1_k, W2_w_k, PHASE ∥ CQI_w_k, CQI_wd_k<br>RI_k, W1_k, W2_w_k ∥ CQI_w_k ∥ CQI_wd_k ∥ PHASE<br>RI_k, W1_k, W2_w_k ∥ CQI_w_k ∥ CQI_wd_k, PHASE<br>RI_k, W1_k, W2_w_k ∥ CQI_w_k, PHASE ∥ CQI_wd_k<br>RI_k, W1_k, W2_w_k, PHASE ∥ CQI_w_k ∥ CQI_wd_k |
| | | subband report (CQI and/or W2) | W1 and W2 in separate subframes | W2_w | RI_k, W1_k ∥ W2_w_k, CQI_w_k, CQI_wd_k ∥ CQI_s_k ∥ PHASE<br>RI_k, W1_k ∥ W2_w_k, CQI_w_k, CQI_wd_k ∥ CQI_s_k, PHASE<br>RI_k, W1_k ∥ W2_w_k, CQI_w_k, CQI_wd_k, PHASE ∥ CQI_s_k<br>RI_k, W1_k, PHASE ∥ W2_w_k, CQI_w_k, CQI_wd_k ∥ CQI_s_k<br>RI_k, W1_k ∥ W2_w_k, CQI_w_k, CQI_wd_k ∥ CQI_s_k, CQI_sd_k ∥ PHASE |

TABLE 4-continued

| MI feedback Type (No PMI, PMI) | CoMP JP CQI information | subband/ no subband report | W1/W2 in same or separate subframes | W2_s/W2_w | reporting modes CQI_w_k: wideband CQI of k-th cell CQI_s_k: subband CQI of k-th cell CQI_wd_k: wideband diff. CQI for CoMP JP of k-th cell CQI_sd_k: subband diff. CQI for CoMP JP of k-th cell |
|---|---|---|---|---|---|
| | | | | | RI_k, W1_k ‖ W2_w_k, CQI_w_k, CQI_wd_k ‖ CQI_s_k, CQI_sd_k, PHASE |
| | | | | | RI_k, W1_k ‖ W2_w_k, CQI_w_k, CQI_wd_k, PHASE ‖ CQI_s_k, CQI_sd_k |
| | | | | | RI_k, W1_k, PHASE ‖ W2_w_k, CQI_w_k, CQI_wd_k ‖ CQI_s_k, CQI_sd_k |
| | | | | | RI_k, W1_k ‖ W2_w_k, CQI_w_k, CQI_wd_k ‖ CQI_s_k ‖ CQI_sd_k ‖ PHASE |
| | | | | | RI_k, W1_k ‖ W2_w_k, CQI_w_k, CQI_wd_k ‖ CQI_s_k ‖ CQI_sd_k, PHASE |
| | | | | | RI_k, W1_k ‖ W2_w_k, CQI_w_k, CQI_wd_k ‖ CQI_s_k, PHASE ‖ CQI_sd_k |
| | | | | | RI_k, W1_k ‖ W2_w_k, CQI_w_k, CQI_wd_k, PHASE ‖ CQI_s_k ‖ CQI_sd_k |
| | | | | | RI_k, W1_k, PHASE ‖ W2_w_k, CQI_w_k, CQI_wd_k ‖ CQI_s_k ‖ CQI_sd_k |
| | | | | | RI_k, W1_k ‖ W2_w_k, CQI_w_k ‖ CQI_wd_k ‖ CQI_s_k ‖ PHASE |
| | | | | | RI_k, W1_k ‖ W2_w_k, CQI_w_k ‖ CQI_wd_k ‖ CQI_s_k, PHASE |
| | | | | | RI_k, W1_k ‖ W2_w_k, CQI_w_k ‖ CQI_wd_k, PHASE ‖ CQI_s_k |
| | | | | | RI_k, W1_k ‖ W2_w_k, CQI_w_k, PHASE ‖ CQI_wd_k ‖ CQI_s_k |
| | | | | | RI_k, W1_k, PHASE ‖ W2_w_k, CQI_w_k ‖ CQI_wd_k ‖ CQI_s_k |
| | | | | | RI_k, W1_k ‖ W2_w_k, CQI_w_k ‖ CQI_wd_k ‖ CQI_s_k, CQI_sd_k ‖ PHASE |
| | | | | | RI_k, W1_k ‖ W2_w_k, CQI_w_k ‖ CQI_wd_k ‖ CQI_s_k, CQI_sd_k, PHASE |
| | | | | | RI_k, W1_k ‖ W2_w_k, CQI_w_k ‖ CQI_wd_k, PHASE ‖ CQI_s_k, CQI_sd_k |
| | | | | | RI_k, W1_k ‖ W2_w_k, CQI_w_k, PHASE ‖ CQI_wd_k ‖ CQI_s_k, CQI_sd_k |
| | | | | | RI_k, W1_k, PHASE ‖ W2_w_k, CQI_w_k ‖ CQI_wd_k ‖ CQI_s_k, CQI_sd_k |
| | | | | | RI_k, W1_k ‖ W2_w_k, CQI_w_k ‖ CQI_wd_k ‖ CQI_s_k ‖ CQI_sd_k ‖ PHASE |
| | | | | | RI_k, W1_k ‖ W2_w_k, CQI_w_k ‖ CQI_wd_k ‖ CQI_s_k ‖ CQI_sd_k, PHASE |
| | | | | | RI_k, W1_k ‖ W2_w_k, CQI_w_k ‖ CQI_wd_k ‖ CQI_s_k, PHASE ‖ CQI_sd_k |
| | | | | | RI_k, W1_k ‖ W2_w_k, CQI_w_k ‖ CQI_wd_k, PHASE ‖ CQI_s_k ‖ CQI_sd_k |
| | | | | | RI_k, W1_k ‖ W2_w_k, CQI_w_k, PHASE ‖ CQI_wd_k ‖ CQI_s_k ‖ CQI_sd_k |
| | | | | | RI_k, W1_k, PHASE ‖ |

TABLE 4-continued

| MI feedback Type (No PMI, PMI) | CoMP JP CQI information | subband/ no subband report | W1/W2 in same or separate subframes | W2_s/W2_w | reporting modes CQI_w_k: wideband CQI of k-th cell CQI_s_k: subband CQI of k-th cell CQI_wd_k: wideband diff. CQI for CoMP JP of k-th cell CQI_sd_k: subband diff. CQI for CoMP JP of k-th cell |
|---|---|---|---|---|---|
| | | | | | W2_w_k, CQI_w_k \|\| CQI_wd_k \|\| CQI_s_k \|\| CQI_sd_k |
| | | | | | RI_k \|\| W1_k \|\| W2_w_k, CQI_w_k, CQI_wd_k \|\| CQI_s_k \|\| PHASE |
| | | | | | RI_k \|\| W1_k \|\| W2_w_k, CQI_w_k, CQI_wd_k \|\| CQI_s_k, PHASE |
| | | | | | RI_k \|\| W1_k \|\| W2_w_k, CQI_w_k, CQI_wd_k, PHASE \|\| CQI_s_k |
| | | | | | RI_k \|\| W1_k, PHASE \|\| W2_w_k, CQI_w_k, CQI_wd_k \|\| CQI_s_k |
| | | | | | RI_k, PHASE \|\| W1_k \|\| W2_w_k, CQI_w_k, CQI_wd_k \|\| CQI_s_k |
| | | | | | RI_k \|\| W1_k \|\| W2_w_k, CQI_w_k, CQI_wd_k \|\| CQI_s_k, CQI_sd_k \|\| PHASE |
| | | | | | RI_k \|\| W1_k \|\| W2_w_k, CQI_w_k, CQI_wd_k \|\| CQI_s_k, CQI_sd_k, PHASE |
| | | | | | RI_k \|\| W1_k \|\| W2_w_k, CQI_w_k, CQI_wd_k, PHASE \|\| CQI_s_k, CQI_sd_k |
| | | | | | RI_k \|\| W1_k, PHASE \|\| W2_w_k, CQI_w_k, CQI_wd_k \|\| CQI_s_k, CQI_sd_k |
| | | | | | RI_k, PHASE \|\| W1_k \|\| W2_w_k, CQI_w_k, CQI_wd_k \|\| CQI_s_k, CQI_sd_k |
| | | | | | RI_k \|\| W1_k \|\| W2_w_k, CQI_w_k, CQI_wd_k \|\| CQI_s_k \|\| CQI_sd_k \|\| PHASE |
| | | | | | RI_k \|\| W1_k \|\| W2_w_k, CQI_w_k, CQI_wd_k \|\| CQI_s_k \|\| CQI_sd_k, PHASE |
| | | | | | RI_k \|\| W1_k \|\| W2_w_k, CQI_w_k, CQI_wd_k \|\| CQI_s_k, PHASE \|\| CQI_sd_k |
| | | | | | RI_k \|\| W1_k \|\| W2_w_k, CQI_w_k, CQI_wd_k, PHASE \|\| CQI_s_k \|\| CQI_sd_k |
| | | | | | RI_k \|\| W1_k, PHASE \|\| W2_w_k, CQI_w_k, CQI_wd_k \|\| CQI_s_k \|\| CQI_sd_k |
| | | | | | RI_k, PHASE \|\| W1_k \|\| W2_w_k, CQI_w_k, CQI_wd_k \|\| CQI_s_k \|\| CQI_sd_k |
| | | | | | RI_k \|\| W1_k \|\| W2_w_k, CQI_w_k \|\| CQI_wd_k \|\| CQI_s_k \|\| PHASE |
| | | | | | RI_k \|\| W1_k \|\| W2_w_k, CQI_w_k \|\| CQI_wd_k \|\| CQI_s_k, PHASE |
| | | | | | RI_k \|\| W1_k \|\| W2_w_k, CQI_w_k \|\| CQI_wd_k, PHASE \|\| CQI_s_k |
| | | | | | RI_k \|\| W1_k \|\| W2_w_k, CQI_w_k, PHASE \|\| CQI_wd_k \|\| CQI_s_k |
| | | | | | RI_k \|\| W1_k, PHASE \|\| W2_w_k, CQI_w_k \|\| CQI_wd_k \|\| CQI_s_k |
| | | | | | RI_k, PHASE \|\| W1_k \|\| W2_w_k, CQI_w_k \|\| CQI_wd_k \|\| CQI_s_k |
| | | | | | RI_k \|\| W1_k \|\| W2_w_k, CQI_w_k \|\| CQI_wd_k \|\| CQI_s_k, CQI_sd_k \|\| PHASE |
| | | | | | RI_k \|\| W1_k \|\| |

TABLE 4-continued

| MI feedback Type (No PMI, PMI) | CoMP JP CQI information | subband/ no subband report | W1/W2 in same or separate subframes | W2_s/W2_w | reporting modes CQI_w_k: wideband CQI of k-th cell CQI_s_k: subband CQI of k-th cell CQI_wd_k: wideband diff. CQI for CoMP JP of k-th cell CQI_sd_k: subband diff. CQI for CoMP JP of k-th cell |
|---|---|---|---|---|---|
| | | | | | W2_w_k, CQI_w_k ‖ CQI_wd_k ‖ CQI_s_k, CQI_sd_k, PHASE |
| | | | | | RI_k ‖ W1_k ‖ W2_w_k, CQI_w_k ‖ CQI_wd_k, PHASE ‖ CQI_s_k, CQI_sd_k |
| | | | | | RI_k ‖ W1_k ‖ W2_w_k, CQI_w_k, PHASE ‖ CQI_wd_k ‖ CQI_s_k, CQI_sd_k |
| | | | | | RI_k ‖ W1_k, PHASE ‖ W2_w_k, CQI_w_k ‖ CQI_wd_k ‖ CQI_s_k, CQI_sd_k |
| | | | | | RI_k, PHASE ‖ W1_k ‖ W2_w_k, CQI_w_k ‖ CQI_wd_k ‖ CQI_s_k, CQI_sd_k |
| | | | | | RI_k ‖ W1_k ‖ W2_w_k, CQI_w_k ‖ CQI_wd_k ‖ CQI_s_k ‖ CQI_sd_k ‖ PHASE |
| | | | | | RI_k ‖ W1_k ‖ W2_w_k, CQI_w_k ‖ CQI_wd_k ‖ CQI_s_k ‖ CQI_sd_k, PHASE |
| | | | | | RI_k ‖ W1_k ‖ W2_w_k, CQI_w_k ‖ CQI_wd_k ‖ CQI_s_k, PHASE ‖ CQI_sd_k |
| | | | | | RI_k ‖ W1_k ‖ W2_w_k, CQI_w_k ‖ CQI_wd_k, PHASE ‖ CQI_s_k ‖ CQI_sd_k |
| | | | | | RI_k ‖ W1_k ‖ W2_w_k, CQI_w_k, PHASE ‖ CQI_wd_k ‖ CQI_s_k ‖ CQI_sd_k |
| | | | | | RI_k ‖ W1_k, PHASE ‖ W2_w_k, CQI_w_k ‖ CQI_wd_k ‖ CQI_s_k ‖ CQI_sd_k |
| | | | | | RI_k, PHASE ‖ W1_k ‖ W2_w_k, CQI_w_k ‖ CQI_wd_k ‖ CQI_s_k ‖ CQI_sd_k |
| | | | | | RI_k ‖ W1_k, CQI_w_k, CQI_wd_k ‖ W2_w_k, CQI_s_k ‖ PHASE |
| | | | | | RI_k ‖ W1_k, CQI_w_k, CQI_wd_k ‖ W2_w_k, CQI_s_k, PHASE |
| | | | | | RI_k ‖ W1_k, CQI_w_k, CQI_wd_k, PHASE ‖ W2_w_k, CQI_s_k |
| | | | | | RI_k, PHASE ‖ W1_k, CQI_w_k, CQI_wd_k ‖ W2_w_k, CQI_s_k |
| | | | | | RI_k ‖ W1_k, CQI_w_k, CQI_wd_k ‖ W2_w_k, CQI_s_k, CQI_sd_k ‖ PHASE |
| | | | | | RI_k ‖ W1_k, CQI_w_k, CQI_wd_k ‖ W2_w_k, CQI_s_k, CQI_sd_k, PHASE |
| | | | | | RI_k ‖ W1_k, CQI_w_k, CQI_wd_k, PHASE ‖ W2_w_k, CQI_s_k, CQI_sd_k |
| | | | | | RI_k, PHASE ‖ W1_k, CQI_w_k, CQI_wd_k ‖ W2_w_k, CQI_s_k, CQI_sd_k |
| | | | | | RI_k ‖ W1_k, CQI_w_k, CQI_wd_k ‖ W2_w_k, CQI_s_k ‖ CQI_sd_k ‖ PHASE |
| | | | | | RI_k ‖ W1_k, CQI_w_k, CQI_wd_k ‖ W2_w_k, CQI_s_k ‖ CQI_sd_k, PHASE |
| | | | | | RI_k ‖ W1_k, CQI_w_k, CQI_wd_k ‖ W2_w_k, CQI_s_k, PHASE ‖ CQI_sd_k |
| | | | | | RI_k ‖ |

TABLE 4-continued

| MI feedback Type (No PMI, PMI) | CoMP JP CQI information | subband/ no subband report | W1/W2 in same or separate subframes | W2_s/W2_w | reporting modes CQI_w_k: wideband CQI of k-th cell CQI_s_k: subband CQI of k-th cell CQI_wd_k: wideband diff. CQI for CoMP JP of k-th cell CQI_sd_k: subband diff. CQI for CoMP JP of k-th cell |
|---|---|---|---|---|---|
| | | | | | W1_k, CQI_w_k, CQI_wd_k, PHASE ‖ W2_w_k, CQI_s_k ‖ CQI_sd_k |
| | | | | | RI_k, PHASE ‖ W1_k, CQI_w_k, CQI_wd_k ‖ W2_w_k, CQI_s_k ‖ CQI_sd_k |
| | | | | | RI_k ‖ W1_k, CQI_w_k ‖ CQI_wd_k ‖ W2_w_k, CQI_s_k ‖ PHASE |
| | | | | | RI_k ‖ W1_k, CQI_w_k ‖ CQI_wd_k ‖ W2_w_k, CQI_s_k, PHASE |
| | | | | | RI_k ‖ W1_k, CQI_w_k ‖ CQI_wd_k, PHASE ‖ W2_w_k, CQI_s_k |
| | | | | | RI_k ‖ W1_k, CQI_w_k, PHASE ‖ CQI_wd_k ‖ W2_w_k, CQI_s_k |
| | | | | | RI_k, PHASE ‖ W1_k, CQI_w_k ‖ CQI_wd_k ‖ W2_w_k, CQI_s_k |
| | | | | | RI_k ‖ W1_k, CQI_w_k ‖ CQI_wd_k ‖ W2_w_k, CQI_s_k, CQI_sd_k ‖ PHASE |
| | | | | | RI_k ‖ W1_k, CQI_w_k ‖ CQI_wd_k ‖ W2_w_k, CQI_s_k, CQI_sd_k, PHASE |
| | | | | | RI_k ‖ W1_k, CQI_w_k ‖ CQI_wd_k, PHASE ‖ W2_w_k, CQI_s_k, CQI_sd_k |
| | | | | | RI_k ‖ W1_k, CQI_w_k, PHASE ‖ CQI_wd_k ‖ W2_w_k, CQI_s_k, CQI_sd_k |
| | | | | | RI_k, PHASE ‖ W1_k, CQI_w_k ‖ CQI_wd_k ‖ W2_w_k, CQI_s_k, CQI_sd_k |
| | | | | | RI_k ‖ W1_k, CQI_w_k ‖ CQI_wd_k ‖ W2_w_k, CQI_s_k ‖ CQI_sd_k ‖ PHASE |
| | | | | | RI_k ‖ W1_k, CQI_w_k ‖ CQI_wd_k ‖ W2_w_k, CQI_s_k ‖ CQI_sd_k, PHASE |
| | | | | | RI_k ‖ W1_k, CQI_w_k ‖ CQI_wd_k ‖ W2_w_k, CQI_s_k, PHASE ‖ CQI_sd_k |
| | | | | | RI_k ‖ W1_k, CQI_w_k ‖ CQI_wd_k, PHASE ‖ W2_w_k, CQI_s_k ‖ CQI_sd_k |
| | | | | | RI_k ‖ W1_k, CQI_w_k, PHASE ‖ CQI_wd_k ‖ W2_w_k, CQI_s_k ‖ CQI_sd_k |
| | | | | | RI_k, PHASE ‖ W1_k, CQI_w_k ‖ CQI_wd_k ‖ W2_w_k, CQI_s_k ‖ CQI_sd_k |
| | | | W2_s | RI_k, W1_k ‖ W2_w_k, CQI_w_k, CQI_wd_k ‖ W2_s_k, CQI_s_k ‖ PHASE |
| | | | | | RI_k, W1_k ‖ W2_w_k, CQI_w_k, CQI_wd_k ‖ W2_s_k, CQI_s_k, PHASE |
| | | | | | RI_k, W1_k ‖ W2_w_k, CQI_w_k, CQI_wd_k, PHASE ‖ W2_s_k, CQI_s_k |
| | | | | | RI_k, W1_k, PHASE ‖ W2_w_k, CQI_w_k, CQI_wd_k ‖ W2_s_k, CQI_s_k |
| | | | | | RI_k, W1_k ‖ W2_w_k, CQI_w_k, CQI_wd_k ‖ W2_s_k, CQI_s_k, CQI_sd_k ‖ PHASE |
| | | | | | RI_k, W1_k ‖ W2_w_k, CQI_w_k, CQI_wd_k ‖ W2_s_k, CQI_s_k, CQI_sd_k, PHASE |
| | | | | | RI_k, W1_k ‖ W2_w_k, CQI_w_k, CQI_wd_k, PHASE ‖ W2_s_k, CQI_s_k, CQI_sd_k |

TABLE 4-continued

| MI feedback Type (No PMI, PMI) | CoMP JP CQI information | subband/ no subband report | W1/W2 in same or separate subframes | W2_s/W2_w | reporting modes CQI_w_k: wideband CQI of k-th cell CQI_s_k: subband CQI of k-th cell CQI_wd_k: wideband diff. CQI for CoMP JP of k-th cell CQI_sd_k: subband diff. CQI for CoMP JP of k-th cell |
|---|---|---|---|---|---|
| | | | | | RI_k, W1_k, PHASE ‖ W2_w_k, CQI_w_k, CQI_wd_k ‖ W2_s_k, CQI_s_k, CQI_sd_k |
| | | | | | RI_k, W1_k ‖ W2_w_k, CQI_w_k, CQI_wd_k ‖ W2_s_k, CQI_s_k ‖ CQI_sd_k ‖ PHASE |
| | | | | | RI_k, W1_k ‖ W2_w_k, CQI_w_k, CQI_wd_k ‖ W2_s_k, CQI_s_k ‖ CQI_sd_k, PHASE |
| | | | | | RI_k, W1_k ‖ W2_w_k, CQI_w_k, CQI_wd_k ‖ W2_s_k, CQI_s_k, PHASE ‖ CQI_sd_k |
| | | | | | RI_k, W1_k ‖ W2_w_k, CQI_w_k, CQI_wd_k, PHASE ‖ W2_s_k, CQI_s_k ‖ CQI_sd_k |
| | | | | | RI_k, W1_k, PHASE ‖ W2_w_k, CQI_w_k, CQI_wd_k ‖ W2_s_k, CQI_s_k ‖ CQI_sd_k |
| | | | | | RI_k, W1_k ‖ W2_w_k, CQI_w_k ‖ CQI_wd_k ‖ W2_s_k, CQI_s_k ‖ PHASE |
| | | | | | RI_k, W1_k ‖ W2_w_k, CQI_w_k ‖ CQI_wd_k ‖ W2_s_k, CQI_s_k, PHASE |
| | | | | | RI_k, W1_k ‖ W2_w_k, CQI_w_k ‖ CQI_wd_k, PHASE ‖ W2_s_k, CQI_s_k |
| | | | | | RI_k, W1_k ‖ W2_w_k, CQI_w_k, PHASE ‖ CQI_wd_k ‖ W2_s_k, CQI_s_k |
| | | | | | RI_k, W1_k, PHASE ‖ W2_w_k, CQI_w_k ‖ CQI_wd_k ‖ W2_s_k, CQI_s_k |
| | | | | | RI_k, W1_k ‖ W2_w_k, CQI_w_k ‖ CQI_wd_k ‖ W2_s_k, CQI_s_k, CQI_sd_k ‖ PHASE |
| | | | | | RI_k, W1_k ‖ W2_w_k, CQI_w_k ‖ CQI_wd_k ‖ W2_s_k, CQI_s_k, CQI_sd_k, PHASE |
| | | | | | RI_k, W1_k ‖ W2_w_k, CQI_w_k ‖ CQI_wd_k, PHASE ‖ W2_s_k, CQI_s_k, CQI_sd_k |
| | | | | | RI_k, W1_k ‖ W2_w_k, CQI_w_k, PHASE ‖ CQI_wd_k ‖ W2_s_k, CQI_s_k, CQI_sd_k |
| | | | | | RI_k, W1_k, PHASE ‖ W2_w_k, CQI_w_k ‖ CQI_wd_k ‖ W2_s_k, CQI_s_k, CQI_sd_k |
| | | | | | RI_k, W1_k ‖ W2_w_k, CQI_w_k ‖ CQI_wd_k ‖ W2_s_k, CQI_s_k ‖ CQI_sd_k ‖ PHASE |
| | | | | | RI_k, W1_k ‖ W2_w_k, CQI_w_k ‖ CQI_wd_k ‖ W2_s_k, CQI_s_k ‖ CQI_sd_k, PHASE |
| | | | | | RI_k, W1_k ‖ W2_w_k, CQI_w_k ‖ CQI_wd_k ‖ W2_s_k, CQI_s_k, PHASE ‖ CQI_sd_k |
| | | | | | RI_k, W1_k ‖ W2_w_k, CQI_w_k ‖ CQI_wd_k, PHASE ‖ W2_s_k, CQI_s_k ‖ CQI_sd_k |
| | | | | | RI_k, W1_k ‖ W2_w_k, CQI_w_k, PHASE ‖ CQI_wd_k ‖ W2_s_k, CQI_s_k ‖ CQI_sd_k |
| | | | | | RI_k, W1_k, PHASE ‖ W2_w_k, CQI_w_k ‖ CQI_wd_k ‖ W2_s_k, CQI_s_k ‖ CQI_sd_k |
| | | | | | RI_k ‖ W1_k ‖ W2_w_k, CQI_w_k, CQI_wd_k ‖ |

TABLE 4-continued

| MI feedback Type (No PMI, PMI) | CoMP JP CQI information | subband/ no subband report | W1/W2 in same or separate subframes | W2_s/W2_w | reporting modes CQI_w_k: wideband CQI of k-th cell CQI_s_k: subband CQI of k-th cell CQI_wd_k: wideband diff. CQI for CoMP JP of k-th cell CQI_sd_k: subband diff. CQI for CoMP JP of k-th cell |
|---|---|---|---|---|---|
| | | | | | W2_s_k, CQI_s_k ‖ PHASE |
| | | | | | RI_k ‖ W1_k ‖ |
| | | | | | W2_w_k, CQI_w_k, CQI_wd_k ‖ |
| | | | | | W2_s_k, CQI_s_k, PHASE |
| | | | | | RI_k ‖ W1_k ‖ |
| | | | | | W2_w_k, CQI_w_k, CQI_wd_k, PHASE ‖ W2_s_k, CQI_s_k |
| | | | | | RI_k ‖ W1_k, PHASE ‖ |
| | | | | | W2_w_k, CQI_w_k, CQI_wd_k ‖ |
| | | | | | W2_s_k, CQI_s_k |
| | | | | | RI_k, PHASE ‖ W1_k ‖ |
| | | | | | W2_w_k, CQI_w_k, CQI_wd_k ‖ |
| | | | | | W2_s_k, CQI_s_k |
| | | | | | RI_k ‖ W1_k ‖ |
| | | | | | W2_w_k, CQI_w_k, CQI_wd_k ‖ |
| | | | | | W2_s_k, CQI_s_k, CQI_sd_k ‖ PHASE |
| | | | | | RI_k ‖ W1_k ‖ |
| | | | | | W2_w_k, CQI_w_k, CQI_wd_k ‖ |
| | | | | | W2_s_k, CQI_s_k, CQI_sd_k, PHASE |
| | | | | | RI_k ‖ W1_k ‖ |
| | | | | | W2_w_k, CQI_w_k, CQI_wd_k, PHASE ‖ W2_s_k, CQI_s_k, CQI_sd_k |
| | | | | | RI_k ‖ W1_k, PHASE ‖ |
| | | | | | W2_w_k, CQI_w_k, CQI_wd_k ‖ |
| | | | | | W2_s_k, CQI_s_k, CQI_sd_k |
| | | | | | RI_k, PHASE ‖ W1_k ‖ |
| | | | | | W2_w_k, CQI_w_k, CQI_wd_k ‖ |
| | | | | | W2_s_k, CQI_s_k, CQI_sd_k |
| | | | | | RI_k ‖ W1_k ‖ |
| | | | | | W2_w_k, CQI_w_k, CQI_wd_k ‖ |
| | | | | | W2_s_k, CQI_s_k ‖ CQI_sd_k ‖ PHASE |
| | | | | | RI_k ‖ W1_k ‖ |
| | | | | | W2_w_k, CQI_w_k, CQI_wd_k ‖ |
| | | | | | W2_s_k, CQI_s_k ‖ CQI_sd_k, PHASE |
| | | | | | RI_k ‖ W1_k ‖ |
| | | | | | W2_w_k, CQI_w_k, CQI_wd_k ‖ |
| | | | | | W2_s_k, CQI_s_k, PHASE ‖ CQI_sd_k |
| | | | | | RI_k ‖ W1_k ‖ |
| | | | | | W2_w_k, CQI_w_k, CQI_wd_k, PHASE ‖ W2_s_k, CQI_s_k ‖ CQI_sd_k |
| | | | | | RI_k ‖ W1_k, PHASE ‖ |
| | | | | | W2_w_k, CQI_w_k, CQI_wd_k ‖ |
| | | | | | W2_s_k, CQI_s_k ‖ CQI_sd_k |
| | | | | | RI_k, PHASE ‖ W1_k ‖ |
| | | | | | W2_w_k, CQI_w_k, CQI_wd_k ‖ |
| | | | | | W2_s_k, CQI_s_k ‖ CQI_sd_k |
| | | | | | RI_k ‖ W1_k ‖ |
| | | | | | W2_w_k, CQI_w_k ‖ CQI_wd_k ‖ |
| | | | | | W2_s_k, CQI_s_k ‖ PHASE |
| | | | | | RI_k ‖ W1_k ‖ |
| | | | | | W2_w_k, CQI_w_k ‖ CQI_wd_k ‖ |
| | | | | | W2_s_k, CQI_s_k, PHASE |
| | | | | | RI_k ‖ W1_k ‖ |
| | | | | | W2_w_k, CQI_w_k ‖ |
| | | | | | CQI_wd_k, PHASE ‖ W2_s_k, CQI_s_k |
| | | | | | RI_k ‖ W1_k ‖ |
| | | | | | W2_w_k, CQI_w_k, PHASE ‖ |
| | | | | | CQI_wd_k ‖ W2_s_k, CQI_s_k |
| | | | | | RI_k ‖ W1_k, PHASE ‖ |
| | | | | | W2_w_k, CQI_w_k ‖ CQI_wd_k ‖ |
| | | | | | W2_s_k, CQI_s_k |
| | | | | | RI_k, PHASE ‖ W1_k ‖ |
| | | | | | W2_w_k, CQI_w_k ‖ CQI_wd_k ‖ |
| | | | | | W2_s_k, CQI_s_k |
| | | | | | RI_k ‖ W1_k ‖ |
| | | | | | W2_w_k, CQI_w_k ‖ CQI_wd_k ‖ |
| | | | | | W2_s_k, CQI_s_k, CQI_sd_k ‖ PHASE |
| | | | | | RI_k ‖ W1_k ‖ |
| | | | | | W2_w_k, CQI_w_k ‖ CQI_wd_k ‖ |
| | | | | | W2_s_k, CQI_s_k, CQI_sd_k, PHASE |
| | | | | | RI_k ‖ W1_k ‖ |
| | | | | | W2_w_k, CQI_w_k ‖ |

TABLE 4-continued

| MI feedback Type (No PMI, PMI) | CoMP JP CQI information | subband/ no subband report | W1/W2 in same or separate subframes | W2_s/W2_w | reporting modes CQI_w_k: wideband CQI of k-th cell CQI_s_k: subband CQI of k-th cell CQI_wd_k: wideband diff. CQI for CoMP JP of k-th cell CQI_sd_k: subband diff. CQI for CoMP JP of k-th cell |
|---|---|---|---|---|---|
| | | | | | CQI_wd_k, PHASE \|\| W2_s_k, CQI_s_k, CQI_sd_k |
| | | | | | RI_k \|\| W1_k \|\| W2_w_k, CQI_w_k, PHASE \|\| CQI_wd_k \|\| W2_s_k, CQI_s_k, CQI_sd_k |
| | | | | | RI_k \|\| W1_k, PHASE \|\| W2_w_k, CQI_w_k \|\| CQI_wd_k \|\| W2_s_k, CQI_s_k, CQI_sd_k |
| | | | | | RI_k, PHASE \|\| W1_k \|\| W2_w_k, CQI_w_k \|\| CQI_wd_k \|\| W2_s_k, CQI_s_k, CQI_sd_k |
| | | | | | RI_k \|\| W1_k \|\| W2_w_k, CQI_w_k \|\| CQI_wd_k \|\| W2_s_k, CQI_s_k \|\| CQI_sd_k \|\| PHASE |
| | | | | | RI_k \|\| W1_k \|\| W2_w_k, CQI_w_k \|\| CQI_wd_k \|\| W2_s_k, CQI_s_k \|\| CQI_sd_k, PHASE |
| | | | | | RI_k \|\| W1_k \|\| W2_w_k, CQI_w_k \|\| CQI_wd_k \|\| W2_s_k, CQI_s_k, PHASE \|\| CQI_sd_k |
| | | | | | RI_k \|\| W1_k \|\| W2_w_k, CQI_w_k \|\| CQI_wd_k, PHASE \|\| W2_s_k, CQI_s_k \|\| CQI_sd_k |
| | | | | | RI_k \|\| W1_k \|\| W2_w_k, CQI_w_k, PHASE \|\| CQI_wd_k \|\| W2_s_k, CQI_s_k \|\| CQI_sd_k |
| | | | | | RI_k \|\| W1_k, PHASE \|\| W2_w_k, CQI_w_k \|\| CQI_wd_k \|\| W2_s_k, CQI_s_k \|\| CQI_sd_k |
| | | | | | RI_k, PHASE \|\| W1_k \|\| W2_w_k, CQI_w_k \|\| CQI_wd_k \|\| W2_s_k, CQI_s_k \|\| CQI_sd_k |
| | | | | | RI_k \|\| W1_k, W2_w_k, CQI_w_k, CQI_wd_k \|\| W2_s_k, CQI_s_k \|\| PHASE |
| | | | | | RI_k \|\| W1_k, W2_w_k, CQI_w_k, CQI_wd_k \|\| W2_s_k, CQI_s_k, PHASE |
| | | | | | RI_k \|\| W1_k, W2_w_k, CQI_w_k, CQI_wd_k, PHASE \|\| W2_s_k, CQI_s_k |
| | | | | | RI_k, PHASE \|\| W1_k, W2_w_k, CQI_w_k, CQI_wd_k \|\| W2_s_k, CQI_s_k |
| | | | | | RI_k \|\| W1_k, W2_w_k, CQI_w_k, CQI_wd_k \|\| W2_s_k, CQI_s_k, CQI_sd_k \|\| PHASE |
| | | | | | RI_k \|\| W1_k, W2_w_k, CQI_w_k, CQI_wd_k \|\| W2_s_k, CQI_s_k, CQI_sd_k, PHASE |
| | | | | | RI_k \|\| W1_k, W2_w_k, CQI_w_k, CQI_wd_k, PHASE \|\| W2_s_k, CQI_s_k, CQI_sd_k |
| | | | | | RI_k, PHASE \|\| W1_k, W2_w_k, CQI_w_k, CQI_wd_k \|\| W2_s_k, CQI_s_k, CQI_sd_k |
| | | | | | RI_k \|\| W1_k, W2_w_k, CQI_w_k, CQI_wd_k \|\| W2_s_k, CQI_s_k \|\| CQI_sd_k \|\| PHASE |
| | | | | | RI_k \|\| W1_k, W2_w_k, CQI_w_k, CQI_wd_k \|\| W2_s_k, CQI_s_k \|\| CQI_sd_k \|\| PHASE |
| | | | | | RI_k \|\| W1_k, W2_w_k, CQI_w_k, CQI_wd_k \|\| W2_s_k, CQI_s_k \|\| CQI_sd_k, PHASE |
| | | | | | RI_k \|\| W1_k, W2_w_k, CQI_w_k, CQI_wd_k \|\| W2_s_k, CQI_s_k, PHASE \|\| CQI_sd_k |
| | | | | | RI_k \|\| |

TABLE 4-continued

| MI feedback Type (No PMI, PMI) | CoMP JP CQI information | subband/ no subband report | W1/W2 in same or separate subframes | W2_s/W2_w | reporting modes CQI_w_k: wideband CQI of k-th cell CQI_s_k: subband CQI of k-th cell CQI_wd_k: wideband diff. CQI for CoMP JP of k-th cell CQI_sd_k: subband diff. CQI for CoMP JP of k-th cell |
|---|---|---|---|---|---|
| | | | | | W1_k, W2_w_k, CQI_w_k, CQI_wd_k, PHASE ‖ W2_s_k, CQI_s_k ‖ CQI_sd_k RI_k, PHASE ‖ W1_k, W2_w_k, CQI_w_k, CQI_wd_k ‖ W2_s_k, CQI_s_k ‖ CQI_sd_k RI_k ‖ W1_k, W2_w_k, CQI_w_k ‖ CQI_wd_k ‖ W2_s_k, CQI_s_k ‖ PHASE RI_k ‖ W1_k, W2_w_k, CQI_w_k ‖ CQI_wd_k ‖ W2_s_k, CQI_s_k, PHASE RI_k ‖ W1_k, W2_w_k, CQI_w_k ‖ CQI_wd_k, PHASE ‖ W2_s_k, CQI_s_k RI_k ‖ W1_k, W2_w_k, CQI_w_k, PHASE ‖ CQI_wd_k ‖ W2_s_k, CQI_s_k RI_k, PHASE ‖ W1_k, W2_w_k, CQI_w_k ‖ CQI_wd_k ‖ W2_s_k, CQI_s_k RI_k ‖ W1_k, W2_w_k, CQI_w_k ‖ CQI_wd_k ‖ W2_s_k, CQI_s_k, CQI_sd_k ‖ PHASE RI_k ‖ W1_k, W2_w_k, CQI_w_k ‖ CQI_wd_k ‖ W2_s_k, CQI_s_k, CQI_sd_k, PHASE RI_k ‖ W1_k, W2_w_k, CQI_w_k ‖ CQI_wd_k, PHASE ‖ W2_s_k, CQI_s_k, CQI_sd_k RI_k ‖ W1_k, W2_w_k, CQI_w_k, PHASE ‖ CQI_wd_k ‖ W2_s_k, CQI_s_k, CQI_sd_k RI_k, PHASE ‖ W1_k, W2_w_k, CQI_w_k ‖ CQI_wd_k ‖ W2_s_k, CQI_s_k, CQI_sd_k RI_k ‖ W1_k, W2_w_k, CQI_w_k ‖ CQI_wd_k ‖ W2_s_k, CQI_s_k ‖ CQI_sd_k ‖ PHASE RI_k ‖ W1_k, W2_w_k, CQI_w_k ‖ CQI_wd_k ‖ W2_s_k, CQI_s_k ‖ CQI_sd_k, PHASE RI_k ‖ W1_k, W2_w_k, CQI_w_k ‖ CQI_wd_k ‖ W2_s_k, CQI_s_k, PHASE ‖ CQI_sd_k RI_k ‖ W1_k, W2_w_k, CQI_w_k ‖ CQI_wd_k, PHASE ‖ W2_s_k, CQI_s_k ‖ CQI_sd_k RI_k ‖ W1_k, W2_w_k, CQI_w_k, PHASE ‖ CQI_wd_k ‖ W2_s_k, CQI_s_k ‖ CQI_sd_k RI_k, PHASE ‖ W1_k, W2_w_k, CQI_w_k ‖ CQI_wd_k ‖ W2_s_k, CQI_s_k ‖ CQI_sd_k RI_k ‖ W1_k, CQI_w_k, CQI_wd_k ‖ W2_s_k, CQI_s_k ‖ PHASE RI_k ‖ W1_k, CQI_w_k, CQI_wd_k ‖ W2_s_k, CQI_s_k, PHASE RI_k ‖ W1_k, CQI_w_k, CQI_wd_k, PHASE ‖ W2_s_k, CQI_s_k RI_k, PHASE ‖ W1_k, CQI_w_k, CQI_wd_k ‖ W2_s_k, CQI_s_k RI_k ‖ W1_k, CQI_w_k, CQI_wd_k ‖ |

TABLE 4-continued

| MI feedback Type (No PMI, PMI) | CoMP JP CQI information | subband/ no subband report | W1/W2 in same or separate subframes | W2_s/W2_w | reporting modes CQI_w_k: wideband CQI of k-th cell CQI_s_k: subband CQI of k-th cell CQI_wd_k: wideband diff. CQI for CoMP JP of k-th cell CQI_sd_k: subband diff. CQI for CoMP JP of k-th cell |
|---|---|---|---|---|---|
| | | | | | W2_s_k, CQI_s_k, CQI_sd_k ∥ PHASE RI_k ∥ W1_k, CQI_w_k, CQI_wd_k ∥ W2_s_k, CQI_s_k, CQI_sd_k, PHASE RI_k ∥ W1_k, CQI_w_k, CQI_wd_k, PHASE ∥ W2_s_k, CQI_s_k, CQI_sd_k RI_k, PHASE ∥ W1_k, CQI_w_k, CQI_wd_k ∥ W2_s_k, CQI_s_k, CQI_sd_k RI_k ∥ W1_k, CQI_w_k, CQI_wd_k ∥ W2_s_k, CQI_s_k ∥ CQI_sd_k ∥ PHASE RI_k ∥ W1_k, CQI_w_k, CQI_wd_k ∥ W2_s_k, CQI_s_k ∥ CQI_sd_k, PHASE RI_k ∥ W1_k, CQI_w_k, CQI_wd_k ∥ W2_s_k, CQI_s_k, PHASE ∥ CQI_sd_k RI_k ∥ W1_k, CQI_w_k, CQI_wd_k, PHASE ∥ W2_s_k, CQI_s_k ∥ CQI_sd_k RI_k, PHASE ∥ W1_k, CQI_w_k, CQI_wd_k ∥ W2_s_k, CQI_s_k ∥ CQI_sd_k RI_k ∥ W1_k, CQI_w_k ∥ CQI_wd_k ∥ W2_s_k, CQI_s_k ∥ PHASE RI_k ∥ W1_k, CQI_w_k ∥ CQI_wd_k ∥ W2_s_k, CQI_s_k, PHASE RI_k ∥ W1_k, CQI_w_k ∥ CQI_wd_k, PHASE ∥ W2_s_k, CQI_s_k RI_k ∥ W1_k, CQI_w_k, PHASE ∥ CQI_wd_k ∥ W2_s_k, CQI_s_k RI_k, PHASE ∥ W1_k, CQI_w_k ∥ CQI_wd_k ∥ W2_s_k, CQI_s_k RI_k ∥ W1_k, CQI_w_k ∥ CQI_wd_k ∥ W2_s_k, CQI_s_k, CQI_sd_k ∥ PHASE RI_k ∥ W1_k, CQI_w_k ∥ CQI_wd_k ∥ W2_s_k, CQI_s_k, CQI_sd_k, PHASE RI_k ∥ W1_k, CQI_w_k ∥ CQI_wd_k, PHASE ∥ W2_s_k, CQI_s_k, CQI_sd_k RI_k ∥ W1_k, CQI_w_k, PHASE ∥ CQI_wd_k ∥ W2_s_k, CQI_s_k, CQI_sd_k RI_k, PHASE ∥ W1_k, CQI_w_k ∥ CQI_wd_k ∥ W2_s_k, CQI_s_k, CQI_sd_k RI_k ∥ W1_k, CQI_w_k ∥ CQI_wd_k ∥ W2_s_k, CQI_s_k ∥ CQI_sd_k ∥ PHASE RI_k ∥ W1_k, CQI_w_k ∥ CQI_wd_k ∥ W2_s_k, CQI_s_k ∥ CQI_sd_k, PHASE RI_k ∥ W1_k, CQI_w_k ∥ CQI_wd_k ∥ W2_s_k, CQI_s_k, PHASE ∥ CQI_sd_k RI_k ∥ W1_k, CQI_w_k ∥ CQI_wd_k, PHASE ∥ W2_s_k, CQI_s_k ∥ CQI_sd_k RI_k ∥ W1_k, CQI_w_k, PHASE ∥ CQI_wd_k ∥ W2_s_k, CQI_s_k ∥ CQI_sd_k RI_k, PHASE ∥ W1_k, CQI_w_k ∥ CQI_wd_k ∥ W2_s_k, CQI_s_k ∥ CQI_sd_k |

TABLE 4-continued

| MI feedback Type (No PMI, PMI) | CoMP JP CQI information | subband/ no subband report | W1/W2 in same or separate subframes | W2_s/W2_w | reporting modes CQI_w_k: wideband CQI of k-th cell CQI_s_k: subband CQI of k-th cell CQI_wd_k: wideband diff. CQI for CoMP JP of k-th cell CQI_sd_k: subband diff. CQI for CoMP JP of k-th cell |
|---|---|---|---|---|---|
| | | | W1 and W2 in same subframe | W2_w | RI_k ‖ W1_k, W2_w_k ‖ CQI_w_k, CQI_wd_k ‖ CQI_s_k ‖ PHASE |
| | | | | | RI_k ‖ W1_k, W2_w_k ‖ CQI_w_k, CQI_wd_k ‖ CQI_s_k, PHASE |
| | | | | | RI_k ‖ W1_k, W2_w_k ‖ CQI_w_k, CQI_wd_k, PHASE ‖ CQI_s_k |
| | | | | | RI_k ‖ W1_k, W2_w_k, PHASE ‖ CQI_w_k, CQI_wd_k ‖ CQI_s_k |
| | | | | | RI_k, PHASE ‖ W1_k, W2_w_k ‖ CQI_w_k, CQI_wd_k ‖ CQI_s_k |
| | | | | | RI_k ‖ W1_k, W2_w_k ‖ CQI_w_k, CQI_wd_k ‖ CQI_s_k, CQI_sd_k ‖ PHASE |
| | | | | | RI_k ‖ W1_k, W2_w_k ‖ CQI_w_k, CQI_wd_k ‖ CQI_s_k, CQI_sd_k, PHASE |
| | | | | | RI_k ‖ W1_k, W2_w_k ‖ CQI_w_k, CQI_wd_k, PHASE ‖ CQI_s_k, CQI_sd_k |
| | | | | | RI_k ‖ W1_k, W2_w_k, PHASE ‖ CQI_w_k, CQI_wd_k ‖ CQI_s_k, CQI_sd_k |
| | | | | | RI_k, PHASE ‖ W1_k, W2_w_k ‖ CQI_w_k, CQI_wd_k ‖ CQI_s_k, CQI_sd_k |
| | | | | | RI_k ‖ W1_k, W2_w_k ‖ CQI_w_k, CQI_wd_k ‖ CQI_s_k ‖ CQI_sd_k ‖ PHASE |
| | | | | | RI_k ‖ W1_k, W2_w_k ‖ CQI_w_k, CQI_wd_k ‖ CQI_s_k ‖ CQI_sd_k, PHASE |
| | | | | | RI_k ‖ W1_k, W2_w_k ‖ CQI_w_k, CQI_wd_k ‖ CQI_s_k, PHASE ‖ CQI_sd_k |
| | | | | | RI_k ‖ W1_k, W2_w_k ‖ CQI_w_k, CQI_wd_k, PHASE ‖ CQI_s_k ‖ CQI_sd_k |
| | | | | | RI_k ‖ W1_k, W2_w_k, PHASE ‖ CQI_w_k, CQI_wd_k ‖ CQI_s_k ‖ CQI_sd_k |
| | | | | | RI_k, PHASE ‖ W1_k, W2_w_k ‖ CQI_w_k, CQI_wd_k ‖ CQI_s_k ‖ CQI_sd_k |
| | | | | | RI_k ‖ W1_k, W2_w_k ‖ CQI_w_k ‖ CQI_wd_k ‖ CQI_s_k ‖ PHASE |
| | | | | | RI_k ‖ W1_k, W2_w_k ‖ CQI_w_k ‖ CQI_wd_k ‖ CQI_s_k, PHASE |
| | | | | | RI_k ‖ W1_k, W2_w_k ‖ CQI_w_k ‖ CQI_wd_k, PHASE ‖ CQI_s_k |
| | | | | | RI_k ‖ W1_k, W2_w_k ‖ CQI_w_k, PHASE ‖ CQI_wd_k ‖ CQI_s_k |
| | | | | | RI_k ‖ W1_k, W2_w_k, PHASE ‖ CQI_w_k ‖ CQI_wd_k ‖ CQI_s_k |
| | | | | | RI_k, PHASE ‖ W1_k, W2_w_k ‖ CQI_w_k ‖ CQI_wd_k ‖ CQI_s_k |
| | | | | | RI_k ‖ W1_k, W2_w_k ‖ CQI_w_k ‖ CQI_wd_k ‖ CQI_s_k, CQI_sd_k ‖ PHASE |
| | | | | | RI_k ‖ W1_k, W2_w_k ‖ |

TABLE 4-continued

| MI feedback Type (No PMI, PMI) | CoMP JP CQI information | subband/ no subband report | W1/W2 in same or separate subframes | W2_s/W2_w | reporting modes CQI_w_k: wideband CQI of k-th cell CQI_s_k: subband CQI of k-th cell CQI_wd_k: wideband diff. CQI for CoMP JP of k-th cell CQI_sd_k: subband diff. CQI for CoMP JP of k-th cell |
|---|---|---|---|---|---|
| | | | | | CQI_w_k ∥ CQI_wd_k ∥ CQI_s_k, CQI_sd_k, PHASE |
| | | | | | RI_k ∥ W1_k, W2_w_k ∥ CQI_w_k ∥ CQI_wd_k, PHASE ∥ CQI_s_k, CQI_sd_k |
| | | | | | RI_k ∥ W1_k, W2_w_k ∥ CQI_w_k, PHASE ∥ CQI_wd_k ∥ CQI_s_k, CQI_sd_k |
| | | | | | RI_k ∥ W1_k, W2_w_k, PHASE ∥ CQI_w_k ∥ CQI_wd_k ∥ CQI_s_k, CQI_sd_k |
| | | | | | RI_k, PHASE ∥ W1_k, W2_w_k ∥ CQI_w_k ∥ CQI_wd_k ∥ CQI_s_k, CQI_sd_k |
| | | | | | RI_k ∥ W1_k, W2_w_k ∥ CQI_w_k ∥ CQI_wd_k ∥ CQI_s_k ∥ CQI_sd_k ∥ PHASE |
| | | | | | RI_k ∥ W1_k, W2_w_k ∥ CQI_w_k ∥ CQI_wd_k ∥ CQI_s_k ∥ CQI_sd_k, PHASE |
| | | | | | RI_k ∥ W1_k, W2_w_k ∥ CQI_w_k ∥ CQI_wd_k ∥ CQI_s_k, PHASE ∥ CQI_sd_k |
| | | | | | RI_k ∥ W1_k, W2_w_k ∥ CQI_w_k ∥ CQI_wd_k, PHASE ∥ CQI_s_k ∥ CQI_sd_k |
| | | | | | RI_k ∥ W1_k, W2_w_k ∥ CQI_w_k, PHASE ∥ CQI_wd_k ∥ CQI_s_k ∥ CQI_sd_k |
| | | | | | RI_k ∥ W1_k, W2_w_k, PHASE ∥ CQI_w_k ∥ CQI_wd_k ∥ CQI_s_k ∥ CQI_sd_k |
| | | | | | RI_k, PHASE ∥ W1_k, W2_w_k ∥ CQI_w_k ∥ CQI_wd_k ∥ CQI_s_k ∥ CQI_sd_k |
| | | | | | RI_k ∥ W1_k, W2_w_k, CQI_w_k, CQI_wd_k ∥ CQI_s_k ∥ PHASE |
| | | | | | RI_k ∥ W1_k, W2_w_k, CQI_w_k, CQI_wd_k ∥ CQI_s_k, PHASE |
| | | | | | RI_k ∥ W1_k, W2_w_k, CQI_w_k, CQI_wd_k, PHASE ∥ CQI_s_k |
| | | | | | RI_k, PHASE ∥ W1_k, W2_w_k, CQI_w_k, CQI_wd_k ∥ CQI_s_k |
| | | | | | RI_k ∥ W1_k, W2_w_k, CQI_w_k, CQI_wd_k ∥ CQI_s_k, CQI_sd_k ∥ PHASE |
| | | | | | RI_k ∥ W1_k, W2_w_k, CQI_w_k, CQI_wd_k ∥ CQI_s_k, CQI_sd_k, PHASE |
| | | | | | RI_k ∥ W1_k, W2_w_k, CQI_w_k, CQI_wd_k, PHASE ∥ CQI_s_k, CQI_sd_k |
| | | | | | RI_k, PHASE ∥ W1_k, W2_w_k, CQI_w_k, CQI_wd_k ∥ CQI_s_k, CQI_sd_k |
| | | | | | RI_k ∥ W1_k, W2_w_k, CQI_w_k, CQI_wd_k ∥ CQI_s_k ∥ CQI_sd_k ∥ PHASE |
| | | | | | RI_k ∥ W1_k, W2_w_k, CQI_w_k, CQI_wd_k ∥ CQI_s_k ∥ CQI_sd_k, PHASE |
| | | | | | RI_k ∥ W1_k, W2_w_k, CQI_w_k, CQI_wd_k ∥ CQI_s_k, PHASE ∥ CQI_sd_k |
| | | | | | RI_k ∥ W1_k, W2_w_k, CQI_w_k, CQI_wd_k, PHASE ∥ CQI_s_k ∥ CQI_sd_k |
| | | | | | RI_k, PHASE ∥ |

TABLE 4-continued

| MI feedback Type (No PMI, PMI) | CoMP JP CQI information | subband/ no subband report | W1/W2 in same or separate subframes | W2_s/W2_w | reporting modes CQI_w_k: wideband CQI of k-th cell CQI_s_k: subband CQI of k-th cell CQI_wd_k: wideband diff. CQI for CoMP JP of k-th cell CQI_sd_k: subband diff. CQI for CoMP JP of k-th cell |
|---|---|---|---|---|---|
| | | | | | W1_k, W2_w_k, CQI_w_k, CQI_wd_k ‖ CQI_s_k ‖ CQI_sd_k |
| | | | | | RI_k ‖ W1_k, W2_w_k, CQI_w_k ‖ CQI_wd_k ‖ CQI_s_k ‖ PHASE |
| | | | | | RI_k ‖ W1_k, W2_w_k, CQI_w_k ‖ CQI_wd_k ‖ CQI_s_k, PHASE |
| | | | | | RI_k ‖ W1_k, W2_w_k, CQI_w_k ‖ CQI_wd_k, PHASE ‖ CQI_s_k |
| | | | | | RI_k ‖ W1_k, W2_w_k, CQI_w_k, PHASE ‖ CQI_wd_k ‖ CQI_s_k |
| | | | | | RI_k, PHASE ‖ W1_k, W2_w_k, CQI_w_k ‖ CQI_wd_k ‖ CQI_s_k |
| | | | | | RI_k ‖ W1_k, W2_w_k, CQI_w_k ‖ CQI_wd_k ‖ CQI_s_k, CQI_sd_k ‖ PHASE |
| | | | | | RI_k ‖ W1_k, W2_w_k, CQI_w_k ‖ CQI_wd_k ‖ CQI_s_k, CQI_sd_k, PHASE |
| | | | | | RI_k ‖ W1_k, W2_w_k, CQI_w_k ‖ CQI_wd_k, PHASE ‖ CQI_s_k, CQI_sd_k |
| | | | | | RI_k ‖ W1_k, W2_w_k, CQI_w_k, PHASE ‖ CQI_wd_k ‖ CQI_s_k, CQI_sd_k |
| | | | | | RI_k, PHASE ‖ W1_k, W2_w_k, CQI_w_k ‖ CQI_wd_k ‖ CQI_s_k, CQI_sd_k |
| | | | | | RI_k ‖ W1_k, W2_w_k, CQI_w_k ‖ CQI_wd_k ‖ CQI_s_k ‖ CQI_sd_k ‖ PHASE |
| | | | | | RI_k ‖ W1_k, W2_w_k, CQI_w_k ‖ CQI_wd_k ‖ CQI_s_k ‖ CQI_sd_k, PHASE |
| | | | | | RI_k ‖ W1_k, W2_w_k, CQI_w_k ‖ CQI_wd_k ‖ CQI_s_k, PHASE ‖ CQI_sd_k |
| | | | | | RI_k ‖ W1_k, W2_w_k, CQI_w_k ‖ CQI_wd_k, PHASE ‖ CQI_s_k ‖ CQI_sd_k |
| | | | | | RI_k ‖ W1_k, W2_w_k, CQI_w_k, PHASE ‖ CQI_wd_k ‖ CQI_s_k ‖ CQI_sd_k |
| | | | | | RI_k, PHASE ‖ W1_k, W2_w_k, CQI_w_k ‖ CQI_wd_k ‖ CQI_s_k ‖ CQI_sd_k |
| | | | | | RI_k, W1_k, W2_w_k ‖ CQI_w_k, CQI_wd_k ‖ CQI_s_k ‖ PHASE |
| | | | | | RI_k, W1_k, W2_w_k ‖ CQI_w_k, CQI_wd_k ‖ CQI_s_k, PHASE |
| | | | | | RI_k, W1_k, W2_w_k ‖ CQI_w_k, CQI_wd_k, PHASE ‖ CQI_s_k |
| | | | | | RI_k, W1_k, W2_w_k, PHASE ‖ CQI_w_k, CQI_wd_k ‖ CQI_s_k |
| | | | | | RI_k, W1_k, W2_w_k ‖ CQI_w_k, CQI_wd_k ‖ CQI_s_k, CQI_sd_k ‖ PHASE |
| | | | | | RI_k, W1_k, W2_w_k ‖ CQI_w_k, CQI_wd_k ‖ CQI_s_k, CQI_sd_k, PHASE |
| | | | | | RI_k, W1_k, W2_w_k ‖ CQI_w_k, CQI_wd_k, PHASE ‖ CQI_s_k, CQI_sd_k |

TABLE 4-continued

| MI feedback Type (No PMI, PMI) | CoMP JP CQI information | subband/ no subband report | W1/W2 in same or separate subframes | W2_s/W2_w | reporting modes CQI_w_k: wideband CQI of k-th cell CQI_s_k: subband CQI of k-th cell CQI_wd_k: wideband diff. CQI for CoMP JP of k-th cell CQI_sd_k: subband diff. CQI for CoMP JP of k-th cell |
|---|---|---|---|---|---|
| | | | | | RI_k, W1_k, W2_w_k, PHASE \|\| CQI_w_k, CQI_wd_k \|\| CQI_s_k, CQI_sd_k |
| | | | | | RI_k, W1_k, W2_w_k \|\| CQI_w_k, CQI_wd_k \|\| CQI_s_k \|\| CQI_sd_k \|\| PHASE |
| | | | | | RI_k, W1_k, W2_w_k \|\| CQI_w_k, CQI_wd_k \|\| CQI_s_k \|\| CQI_sd_k, PHASE |
| | | | | | RI_k, W1_k, W2_w_k \|\| CQI_w_k, CQI_wd_k \|\| CQI_s_k, PHASE \|\| CQI_sd_k |
| | | | | | RI_k, W1_k, W2_w_k \|\| CQI_w_k, CQI_wd_k, PHASE \|\| CQI_s_k \|\| CQI_sd_k |
| | | | | | RI_k, W1_k, W2_w_k, PHASE \|\| CQI_w_k, CQI_wd_k \|\| CQI_s_k \|\| CQI_sd_k |
| | | | | | RI_k, W1_k, W2_w_k \|\| CQI_w_k \|\| CQI_wd_k \|\| CQI_s_k \|\| PHASE |
| | | | | | RI_k, W1_k, W2_w_k \|\| CQI_w_k \|\| CQI_wd_k \|\| CQI_s_k, PHASE |
| | | | | | RI_k, W1_k, W2_w_k \|\| CQI_w_k \|\| CQI_wd_k, PHASE \|\| CQI_s_k |
| | | | | | RI_k, W1_k, W2_w_k \|\| CQI_w_k, PHASE \|\| CQI_wd_k \|\| CQI_s_k |
| | | | | | RI_k, W1_k, W2_w_k, PHASE \|\| CQI_w_k \|\| CQI_wd_k \|\| CQI_s_k |
| | | | | | RI_k, W1_k, W2_w_k \|\| CQI_w_k \|\| CQI_wd_k \|\| CQI_s_k, CQI_sd_k \|\| PHASE |
| | | | | | RI_k, W1_k, W2_w_k \|\| CQI_w_k \|\| CQI_wd_k \|\| CQI_s_k, CQI_sd_k, PHASE |
| | | | | | RI_k, W1_k, W2_w_k \|\| CQI_w_k \|\| CQI_wd_k, PHASE \|\| CQI_s_k, CQI_sd_k |
| | | | | | RI_k, W1_k, W2_w_k \|\| CQI_w_k, PHASE \|\| CQI_wd_k \|\| CQI_s_k, CQI_sd_k |
| | | | | | RI_k, W1_k, W2_w_k, PHASE \|\| CQI_w_k \|\| CQI_wd_k \|\| CQI_s_k, CQI_sd_k |
| | | | | | RI_k, W1_k, W2_w_k \|\| CQI_w_k \|\| CQI_wd_k \|\| CQI_s_k \|\| CQI_sd_k \|\| PHASE |
| | | | | | RI_k, W1_k, W2_w_k \|\| CQI_w_k \|\| CQI_wd_k \|\| CQI_s_k \|\| CQI_sd_k, PHASE |
| | | | | | RI_k, W1_k, W2_w_k \|\| CQI_w_k \|\| CQI_wd_k \|\| CQI_s_k, PHASE \|\| CQI_sd_k |
| | | | | | RI_k, W1_k, W2_w_k \|\| CQI_w_k \|\| CQI_wd_k, PHASE \|\| CQI_s_k \|\| CQI_sd_k |
| | | | | | RI_k, W1_k, W2_w_k \|\| CQI_w_k, PHASE \|\| CQI_wd_k \|\| CQI_s_k \|\| CQI_sd_k |
| | | | | | RI_k, W1_k, W2_w_k, PHASE \|\| CQI_w_k \|\| CQI_wd_k \|\| CQI_s_k \|\| CQI_sd_k |

Notations of terms of Table 4 may follow the 3GPP LTE-Advanced standard.

According to embodiments, Table 5 may also be defined.

TABLE 5

PUCCH Report Type Payload size per Reporting Mode

| PUCCH Report Type | Reported | Mode State | Mode 1-1 (bits/BP) | Mode 2-1 (bits/BP) | Mode 1-0 (bits/BP) | Mode 2-0 (bits/BP) |
|---|---|---|---|---|---|---|
| 1 | Sub-band CQI | RI = 1 | NA | 4 + L | NA | 4 + L |
|   |          | RI > 1 | NA | 7 + L | NA | 4 + L |
| 2 | Wideband CQI/PMI | 2 TX Antennas RI = 1 | 6 | 6 | NA | NA |
|   |          | 4 TX Antennas RI = 1 | 8 | 8 | NA | NA |
|   |          | 2 TX Antennas RI > 1 | 8 | 8 | NA | NA |
|   |          | 4 TX Antennas RI > 1 | 11 | 11 | NA | NA |
| 3 | RI | 2-layer spatial multiplexing | 1 | 1 | 1 | 1 |
|   |    | 4-layer spatial multiplexing | 2 | 2 | 2 | 2 |
| 4 | Wideband CQI | RI = 1 or RI > 1 | NA | NA | 4 | 4 |

TABLE 6

PUCCH Report Type Payload size per Reporting Mode

| PUCCH Report Type | Reported | Mode State | Mode 1-1 (bits/BP) | Mode 2-1 (bits/BP) | Mode 1-0 (bits/BP) | Mode 2-0 (bits/BP) | Mode 2-2 (bits/BP) |
|---|---|---|---|---|---|---|---|
| 1 | Sub-band CQI | RI = 1 | NA | 4 + L | NA | 4 + L | NA |
|   |   | RI > 1 | NA | 7 + L | NA | 4 + L | NA |
| 2 | Wideband CQI/PMI | 2 TX Antennas RI = 1 | 6 | 6 | NA | NA | 6 |
|   |   | 4 TX Antennas RI = 1 | 8 | 8 | NA | NA | 8 |
|   |   | 8 TX Antennas RI = 1 | 8 | 8 | NA | NA | 8 |
|   |   | 2 TX Antennas RI > 1 | 8 | 8 | NA | NA | 8 |
|   |   | 4 TX Antennas RI > 1 | 11 | 11 | NA | NA | 11 |
|   |   | 8 TX Antennas RI > 1 | 11 | 11 | NA | NA | 11 |
| 3 | RI | 2-layer spatial multiplexing | 1 | 1 | 1 | 1 | 1 |
|   |   | 4-layer spatial multiplexing | 2 | 2 | 2 | 2 | 2 |
|   |   | 8-layer spatial multiplexing | 3 | 3 | 3 | 3 | 3 |
| 4 | Wideband CQI | RI = 1 or RI > 1 | NA | NA | 4 | 4 | NA |
| 5 | Sub-band CQI/subband PMI | 2 TX Antennas RI = 1 | NA | NA | NA | NA | NA |
|   |   | 4 TX Antennas RI = 1 | NA | NA | NA | NA | 4 + L + 2 |
|   |   | 8 TX Antennas RI = 1 | NA | NA | NA | NA | 4 + L + 2 |
|   |   | 2 TX Antennas RI = 2 | NA | NA | NA | NA | NA |
|   |   | 4 TX Antennas RI = 2 | NA | NA | NA | NA | 7 + L + 2 |
|   |   | 8 TX Antennas RI = 2 | NA | NA | NA | NA | 7 + L + 2 |
|   |   | 2 TX Antennas RI > 2 | NA | NA | NA | NA | NA |
|   |   | 4 TX Antennas RI > 2 | NA | NA | NA | NA | 7 + L |
|   |   | 8 TX Antennas RI > 2 | NA | NA | NA | NA | 7 + L |

TABLE 7

PUCCH Report Type Payload size per Reporting Mode

| | | PUCCH Reporting Modes | | | | | | | | |
|---|---|---|---|---|---|---|---|---|---|---|
| Reported | Mode State | Mode 1-1 (bits/BP) | Mode 2-1 (bits/BP) | Mode 1-0 bits/BP | Mode 2-0 bits/BP | Mode 2-2 bits/BP | New 1 bits/BP | New 2 bits/BP | New 3 bits/BP | New 4 (bits/BP) |
| PUCCH Report Type — Sub-band QI | RI = 1 | NA | 4 + L | A | +L | A | A | A | A | NA |
| | RI > 1 | NA | 7 + L | A | +L | A | A | A | A | NA |
| Wideband CQI/PMI | 2 TX Antennas RI = 1 | 6 | 6 | A | A | | | A | | 6 |
| | 4 TX Antennas RI = 1 | 8 | 8 | A | A | | | A | | 8 |
| | 8 TX Antennas RI = 1 | 8 | 8 | A | A | | | A | | 8 |
| | 2 TX Antennas RI > 1 | 8 | 8 | A | A | | | A | | 8 |
| | 4 TX Antennas RI > 1 | 11 | 11 | A | A | 1 | 1 | A | 1 | 11 |
| | 8 TX Antennas RI > 1 | 11 | 11 | A | A | 1 | 1 | A | 1 | 11 |
| I | 2-layer spatial multiplexing | 1 | 1 | | | | | | | NA |
| | 4-layer spatial multiplexing | 2 | 2 | | | | | | | NA |
| | 8-layer spatial multiplexing | 3 | 3 | | | | | | | NA |
| Wideband CQI | RI = 1 or RI > 1 | NA | NA | | A | A | A | A | A | NA |
| Sub-band CQI/subband PMI | 2 TX Antennas RI = 1 | NA | NA | A | A | A | A | A | A | NA |
| | 4 TX Antennas RI = 1 | NA | NA | A | A | +L + 2 | A | +L + 2 | A | 4 + L + 2 |
| | 8 TX Antennas RI = 1 | NA | NA | A | A | +L + 2 | A | +L + 2 | A | 4 + L + 2 |
| | 2 TX Antennas RI = 2 | NA | NA | A | A | A | A | A | A | NA |
| | 4 TX Antennas RI = 2 | NA | NA | A | A | +L + 2 | A | +L + 2 | A | 7 + L + 2 |
| | 8 TX Antennas RI = 2 | NA | NA | A | A | +L + 2 | A | +L + 2 | A | 7 + L + 2 |
| | 2 TX Antennas RI > 2 | NA | NA | A | A | A | A | A | A | NA |
| | 4 TX Antennas RI > 2 | NA | NA | A | A | +L | A | +L | A | 7 + L |
| | 8 TX Antennas RI > 2 | NA | NA | A | A | +L | A | +L | A | 7 + L |
| PHASE | PHASE information | NA | NA | A | A | A | | A | A | NA |
| Wideband CQI/PMI/PHASE | 2 TX Antennas RI = 1 | 6 | 6 | A | A | | A | +P | A | NA |
| | 4 TX Antennas RI = 1 | 8 | 8 | A | A | | A | +P | A | NA |
| | 8 TX Antennas RI = 1 | 8 | 8 | A | A | | A | +P | A | NA |
| | 2 TX Antennas RI > 1 | 8 | 8 | A | A | | A | +P | A | NA |
| | 4 TX Antennas RI > 1 | 11 | 11 | A | A | 1 | A | 1 | A | NA |
| | 8 TX Antennas RI > 1 | 11 | 11 | A | A | 1 | A | 1 | A | NA |
| Sub-band CQI/subband PMI/PHASE | 2 TX Antennas RI = 1 | NA | NA | A | A | A | A | A | A | NA |
| | 4 TX Antennas RI = 1 | NA | NA | A | A | A | A | A | +L + 2 + P | NA |
| | 8 TX Antennas RI = 1 | NA | NA | A | A | A | A | A | +L + 2 + P | NA |
| | 2 TX Antennas RI = 2 | NA | NA | A | A | A | A | A | A | NA |
| | 4 TX Antennas RI = 2 | NA | NA | A | A | A | A | A | +L + 2 | NA |

TABLE 7-continued

PUCCH Report Type Payload size per Reporting Mode

| | | PUCCH Reporting Modes | | | | | | | | |
|---|---|---|---|---|---|---|---|---|---|---|
| Reported | Mode State | Mode 1-1 (bits/BP) | Mode 2-1 (bits/BP) | Mode 1-0 bits/BP) | Mode 2-0 bits/BP) | Mode 2-2 bits/BP) | New 1 bits/BP) | New 2 bits/BP) | New 3 bits/BP) | New 4 (bits/BP) |
| RI/PHASE | 8 TX Antennas RI = 2 | NA | NA | A | A | A | A | A | +L + 2 | NA |
| | 2 TX Antennas RI > 2 | NA | NA | A | A | A | A | A | A | NA |
| | 4 TX Antennas RI > 2 | NA | NA | A | A | A | A | A | +L | NA |
| | 8 TX Antennas RI > 2 | NA | NA | A | A | A | A | A | +L | NA |
| | 2-layer spatial multiplexing | NA | NA | A | A | A | A | A | A | 1 + P |
| | 4-layer spatial multiplexing | NA | NA | A | A | A | A | A | A | 2 + P |
| | 8-layer spatial multiplexing | NA | NA | A | A | A | A | A | A | 3 + P |

As described herein, P may denote a bit size with respect to phase information. For example, P may indicate two bits, three bits, four bits, and the like. Bit allocation with respect to phase information may vary based on a number of CoMP measurement sets or CoMP transmission points. For example, if the terminal feeds back PMI/CQI with respect to CoMP measurement sets, additional base station information may be jointly encoded. For example, RI/PHASE information may be encoded jointly together with PMI/CQI. The PMI/CQI with respect to the CoMP measurement sets may be fed back to the base station according to a scheme predetermined between the terminal and the base station.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable storage mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

As a non-exhaustive illustration only, a terminal/device/unit described herein may refer to mobile devices such as a cellular phone, a personal digital assistant (PDA), a digital camera, a portable game console, and an MP3 player, a portable/personal multimedia player (PMP), a handheld e-book, a portable laptop PC, a global positioning system (GPS) navigation, a tablet, a sensor, and devices such as a desktop PC, a high definition television (HDTV), an optical disc player, a setup box, a home appliance, and the like that are capable of wireless communication or network communication consistent with that which is disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer. It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of determining a beamforming vector in a multiple-input multiple-output (MIMO) communication system comprising a plurality of base stations and a plurality of terminals, the method comprising:

computing a normalization factor for each of the terminals by normalizing a predetermined reference value using a respective noise power occurring in each of the terminals;

computing a leakage channel of each of the terminals via which interference occurs due to a beamforming vector for each of the terminals, based on the computed normalization factors of each of the terminals; and determining the beamforming vector for each of the terminals with respect to the plurality of base stations based on the leakage channel of each of the terminals.

2. The method of claim 1, wherein the determining comprises determining the beamforming vector for each of the terminals to increase a signal to leakage and noise ratio (SLNR) of each of the terminals.

3. The method of claim 1, further comprising:

computing first beamforming vectors for each of the terminals in which noise power occurring in each of the other terminals is discarded, wherein the determining comprises determining the beamforming vector for each of the terminals using the leakage channel and the first beamforming vectors.

4. The method of claim 3, wherein the computing of the beamforming vector comprises computing the beamforming vector for each of the terminals using a sum of the first powers of the first beamforming vectors.

5. The method of claim 1, wherein a first terminal from among the plurality of terminals is connected to a first set comprising a portion of the plurality of base stations, and a second terminal from among the plurality of terminals is connected to a second set comprising another portion of the plurality of base stations.

6. The method of claim 1, further comprising:

setting a set of terminals connected to each base station; and setting a set of base stations connected to each terminal, wherein the computing of the leakage channel comprises computing the leakage channel of a terminal based on the set of base stations connected to the terminal, and the determining comprises determining the beamforming vector for the terminal based on the set of terminals connected to the corresponding base station.

7. The method of claim 1, wherein the determining comprises computing an SLNR of each of the terminals based on the leakage channel of each of the terminals.

8. A computer-readable storage medium having stored therein program instructions to cause a processor to execute a method of determining a beamforming vector in a multiple-input multiple-output (MIMO) communication system comprising a plurality of base stations and a plurality of terminals, the method comprising:

computing a normalization factor for each of the terminals by normalizing a predetermined reference value using a respective noise power occurring in each of the terminals;

computing a leakage channel of each of the terminals via which interference occurs due to a beamforming vector for each of the terminals, based on the computed normalization factor of each of the terminals; and determining the beamforming vector for each of the terminals with respect to the plurality of base stations based on the leakage channel of each of the terminals.

9. A communication apparatus for determining a beamforming vector in a multiple-input multiple-output (MIMO) communication system comprising a plurality of base stations and a plurality of terminals, the apparatus comprising:

a computing unit configured to compute a normalization factor for each of the terminals by normalizing a predetermined reference value using a respective noise power occurring in each of the terminals;

an estimator configured to estimate a leakage channel of each of the terminals via which interference occurs due to a beamforming vector for each of the terminals, based on the computed normalization factors of each of the terminals; and a determining unit configured to determine the beamforming vector for each of the terminals with respect to the plurality of base stations based on the leakage channel of each of the terminals.

10. The communication apparatus of claim 9, wherein the determining unit is configured to determine the beamforming vector for each of the terminals to increase a signal to leakage and noise ratio (SLNR) of each of the terminals.

11. The communication apparatus of claim 9, wherein the computing unit is further configured to compute first beamforming vectors for each of the terminals in which noise power occurring in each of the other terminals is discarded, and the determining unit is further configured to determine the beamforming vector for each of the terminals using the leakage channel and the first beamforming vectors.

12. The communication apparatus of claim 11, wherein the computing of the beamforming vector comprises computing the beamforming vector for each of the terminals using a sum of the first powers of the first beamforming vectors.

13. The communication apparatus of claim 9, wherein a first terminal from among the plurality of terminals is connected to a first set comprising a portion of the plurality of base stations, and a second terminal from among the plurality of terminals is connected to a second set comprising another portion of the plurality of base stations.

14. The communication apparatus of claim 9, wherein the determining unit is further configured to compute an SLNR of each of the terminals based on the leakage channel of each of the terminals.

\* \* \* \* \*